(12) United States Patent
    Ryu

(10) Patent No.: US 9,883,329 B2
(45) Date of Patent: Jan. 30, 2018

(54) METHOD AND ELECTRONIC DEVICE FOR TRANSMITTING DATA

(71) Applicant: Samsung Electronics Co., Ltd., Suwon-si, Gyeonggi-do (KR)

(72) Inventor: Kyu Sang Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 15/159,173

(22) Filed: May 19, 2016

(65) Prior Publication Data
    US 2017/0026780 A1    Jan. 26, 2017

(30) Foreign Application Priority Data
    Jul. 21, 2015  (KR) ........................ 10-2015-0103309

(51) Int. Cl.
    *H04B 7/00*     (2006.01)
    *H04W 4/00*     (2009.01)
    *H04L 29/06*    (2006.01)
    *H04L 5/00*     (2006.01)

(52) U.S. Cl.
    CPC ........... *H04W 4/008* (2013.01); *H04L 5/0055* (2013.01); *H04L 65/607* (2013.01)

(58) Field of Classification Search
    CPC ..... H04W 84/18; H04W 4/008; H04W 8/005; H04W 76/02; H04W 12/06; H04W 76/023; H04W 4/00; H04W 84/12; H04W 88/02; H04W 88/06
    See application file for complete search history.

(56) References Cited

U.S. PATENT DOCUMENTS

| 5,285,200 A | * | 2/1994 | Kuriyama | G06Q 20/341 235/380 |
| 5,737,481 A | * | 4/1998 | Gushima | G11B 19/042 386/235 |
| 8,385,934 B2 | | 2/2013 | Choi | |
| 8,554,137 B2 | | 10/2013 | Wyper et al. | |
| 8,606,182 B2 | | 12/2013 | Wyper et al. | |
| 8,630,197 B2 | * | 1/2014 | Chu | H04W 28/06 370/252 |
| 9,124,673 B2 | | 9/2015 | Somayazulu et al. | |
| 9,295,075 B2 | | 3/2016 | Wyper et al. | |
| 2002/0065043 A1 | * | 5/2002 | Hamada | H04W 28/06 455/41.3 |
| 2005/0053037 A1 | * | 3/2005 | Ginzburg | H04L 1/0002 370/333 |

(Continued)

FOREIGN PATENT DOCUMENTS

KR    10-2010-0083235 A    7/2010

*Primary Examiner* — Ankur Jain
*Assistant Examiner* — Max Mathew
(74) *Attorney, Agent, or Firm* — Jefferson IP Law, LLP

(57) ABSTRACT

An electronic device and method for transmitting data using Bluetooth communication technology are provided. The electronic device includes a memory, a communication circuit configured to communicate with an external device based on a protocol, and a processor configured to generate second data by encoding first data based on an encoding parameter, to store the second data in the memory, to transmit the second data to the external device through the communication circuit, and to change the encoding parameter based on a remaining storage space of the memory.

16 Claims, 20 Drawing Sheets

(56) References Cited

U.S. PATENT DOCUMENTS

| | | | |
|---|---|---|---|
| 2006/0109814 A1* | 5/2006 | Kuzminskiy | H04B 7/0408 370/329 |
| 2008/0037482 A1* | 2/2008 | Douglas | H04L 43/08 370/338 |
| 2008/0192806 A1 | 8/2008 | Wyper et al. | |
| 2010/0134336 A1* | 6/2010 | Sung | H03H 17/0685 341/144 |
| 2010/0178870 A1 | 7/2010 | Choi | |
| 2010/0309831 A1* | 12/2010 | Yeh | H04W 52/0216 370/311 |
| 2011/0032832 A1* | 2/2011 | Jalali | H04L 47/10 370/252 |
| 2012/0039391 A1* | 2/2012 | Frusina | H04L 47/25 375/240.07 |
| 2013/0177043 A1 | 7/2013 | Wyper et al. | |
| 2014/0056288 A1 | 2/2014 | Wyper et al. | |
| 2015/0071334 A1* | 3/2015 | Chini | H04B 1/10 375/219 |
| 2015/0095508 A1 | 4/2015 | Somayazulu et al. | |
| 2015/0312855 A1* | 10/2015 | Razaghi | H04W 52/0216 370/311 |

* cited by examiner

| BITPOOL VALUE (BIT) | CONDITION |
|---|---|
| +1 | IN THE CASE WHERE QUEUE COUNT IS UPDATED TO 0 |
| +2 | IN THE CASE WHERE QUEUE COUNT OF 0 IS MAINTAINED OVER 80ms |
| -1 | IN THE CASE WHERE QUEUE COUNT INCREASES BY 2 WITHIN 40ms |
| -2 | IN THE CASE WHERE QUEUE COUNT CONTINUOUSLY INCREASES BY 2 EVERY 40ms |
| MIN | IN THE CASE WHERE QUEUE COUNT IS MAXIMUM |

FIG. 8

METHOD AND ELECTRONIC DEVICE FOR TRANSMITTING DATA

CROSS-REFERENCE TO RELATED APPLICATION(S)

This application claims the benefit under 35 U.S.C. § 119(a) of a Korean patent application filed on Jul. 21, 2015 in the Korean Intellectual Property Office and assigned Serial number 10-2015-0103309, the entire disclosure of which is hereby incorporated by reference.

TECHNICAL FIELD

The present disclosure relates to a method for transmitting data using Bluetooth communication technology and an electronic device for performing the same.

BACKGROUND

As an Internet of things (IoT) has been is being widely distributed in recent years, a low-power wireless communication is significantly important in a local network. As an example of the low-power wireless communication, the Bluetooth communication is applied to various electronic devices such as smartphones, wearable devices, headsets, speakers, vehicles, televisions (TVs), and the like. The Bluetooth communication is used in a wide range from a data communication service to various services such as a voice service, an audio streaming service, a text service, and a control service of any other electronic device.

The audio streaming service among the above-mentioned services that are based on the Bluetooth communication is most widely used by users. For example, a user obtains a sound source from a network by using a smartphone and listens to the sound source by using a headset, a speaker, or the like connected to the smartphone through a Bluetooth communication. To this end, the smartphone generates audio streaming data by encoding data of the sound source, and transmits the audio streaming data to the headset or speaker through the Bluetooth communication.

Since communicating with an external device based on a frequency (e.g., 2.4 GHz) according to a specific standard, an electronic device that executes the Bluetooth communication interferes with a communication device, which operates according to another standard, using the same frequency. For example, the frequency of the Bluetooth communication and a communication frequency of wireless fidelity (Wi-Fi) may interfere (or overlap) with each other. The performance of the Bluetooth communication may be significantly reduced due to the interference of the frequency. For example, due to the interference, a packet error, a packet loss, and a packet delay frequently occur among electronic devices that perform the Bluetooth communication.

For example, since audio streaming data is transmitted in real time, the performance of the audio streaming service that is based on the Bluetooth communication, may be reduced (e.g., vulnerable to choppy playback) due to the packet errors, packet loss, and packet delays. As the size of audio streaming data increases, the performance may be reduced more and more.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a data transmitting method of monitoring a channel environment in real time and preventing packet errors, packet loss, and packet delays while minimizing a decrease in performance due to due to a decrease in data throughput and an electronic device performing the same.

In accordance with an aspect of the present disclosure, an electronic device is provided. The electronic device includes a memory, a communication circuit configured to communicate with an external device based on a protocol, and a processor configured to generate second data by encoding first data based on an encoding parameter, to store the second data in the memory, to transmit the second data to the external device through the communication circuit and to change the encoding parameter based on a remaining storage space of the memory.

In accordance with an aspect of the present disclosure, a data transmitting method of an electronic device is provided. The data transmitting method includes changing an encoding parameter based on a remaining storage space of a memory included in the electronic device, generating second data by encoding first data based on the encoding parameter, storing the second data in the memory, reading the second data from the memory, and transmitting the second data to an external device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 illustrates a bitpool update policy table according to an embodiment of the present disclosure;

Throughout the drawings, it should be noted that like reference numbers are used to depict the same or similar elements, features, and structures.

DETAILED DESCRIPTION

Figure 1A:
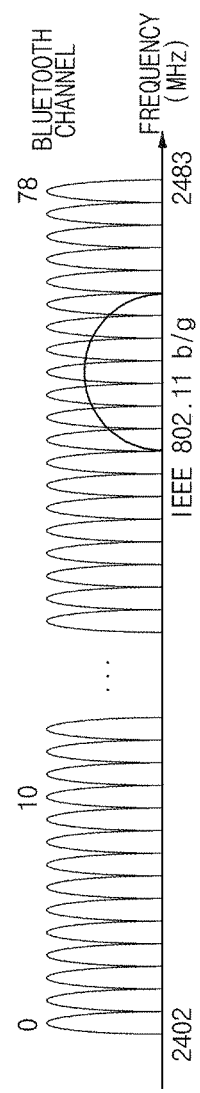
FIG. 1A is a view illustrating a frequency and a channel used according to a Bluetooth communication protocol according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have," "may have," "include" and "comprise," or "may include" and "may comprise" used herein indicate existence of corresponding features (e.g., elements such as numeric values, functions, operations, or components) but do not exclude presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for," "having the capacity to," "designed to," "adapted to," "made to," or "capable of" The term "configured to" must not mean only "specifically designed to" in hardware. Instead, the expression "a device configured to" may mean that the device is "capable of" operating together with another device or other components. Central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Terms used in this specification are used to describe specified embodiments of the present disclosure and are not intended to limit the scope of the present disclosure. The articles "a," "an," and "the" are singular in that they have a single referent, however the use of the singular form in the present disclosure should not preclude the presence of more than one referent. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or an implantable type (e.g., an implantable circuit).

According to an embodiment, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. In this disclosure, the term "user" may refer to a person who uses an electronic device or may refer to a device (e.g., an artificial intelligence electronic device) that uses an electronic device.

FIG. 1A is a view illustrating a frequency and a channel used according to a Bluetooth communication protocol according to an embodiment of the present disclosure.

Referring to FIG. 1A, the Bluetooth communication may use a frequency bandwidth of 2400 to 2483.5 MHz being an industrial scientific and medical (ISM) band. The frequency bandwidth may be divided into 79 channels each of which has a width of 1 MHz. A signal may rise 1600 or more times per second through the frequency bandwidth. The Bluetooth communication may implement a bidirectional communication in a time division duplex (TDD) scheme. According to the TDD scheme, a master device and a slave device may alternately use a time slot of a length of 625 us corresponding to one period of a master clock.

At least a part of the frequency bandwidth of the Bluetooth communication may be overlapped with a frequency bandwidth in which another communication scheme is used. For example, a part of the frequency bandwidth of the Bluetooth communication may be overlapped with a Wi-Fi communication frequency bandwidth according to IEEE 802.11 b/g. Since the frequency bandwidths overlap with each other, frequency interference may be caused in the Bluetooth communication and/or Wi-Fi communication. Accordingly, the quality or performance of communication may be degraded (refer to FIGS. 9A and 9B with regard to performance degradation).

Figure 1B:
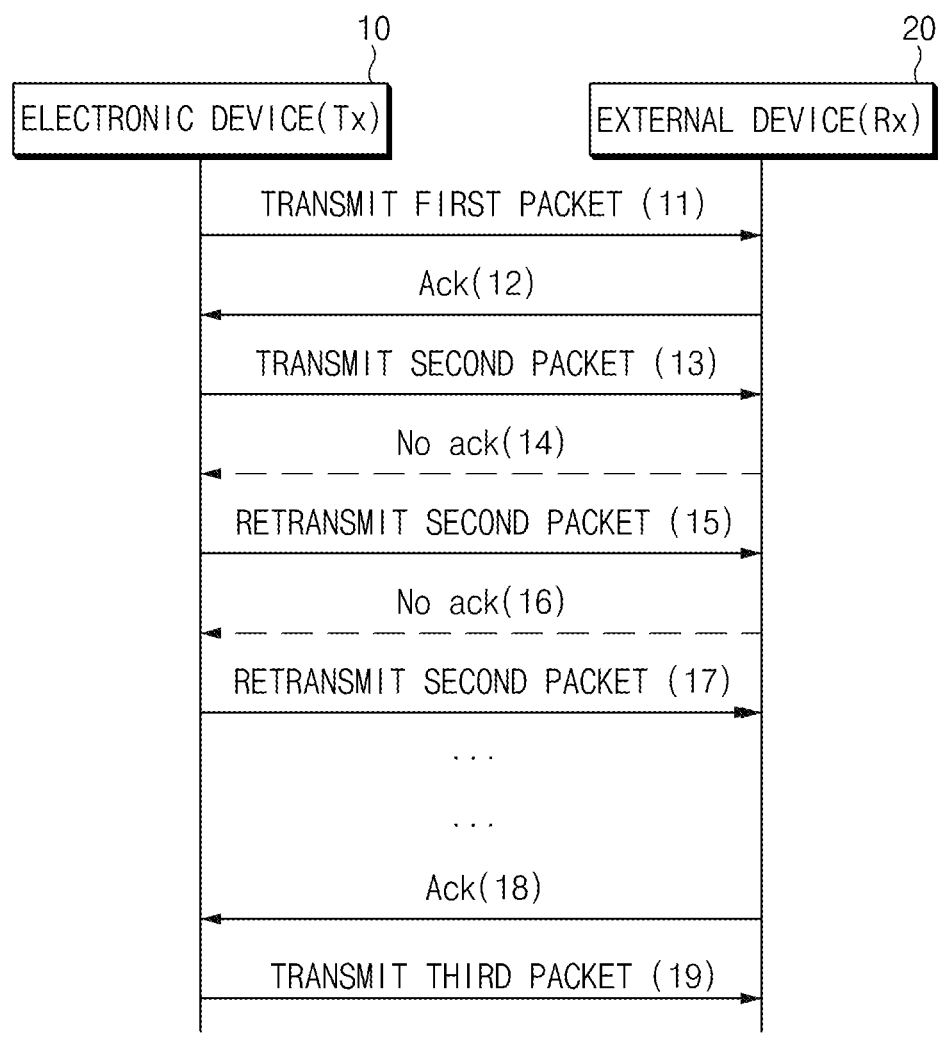
FIG. 1B is a flowchart illustrating a Bluetooth communication between an external device and an electronic device according to an embodiment of the present disclosure.

FIG. 1B is a flowchart illustrating Bluetooth communication between an external device and an electronic device according to an embodiment of the present disclosure.

Referring to FIG. 1B, an electronic device 10 (i.e., a transmission point Tx) may transmit a data packet to an external device 20 (i.e., a reception point Rx) through an embedded Bluetooth module. The electronic device 10 may include, for example, a smartphone, a tablet PC, a wearable device, or the like equipped with a Bluetooth (transmission) module. The external device 20 may include a headset, a speaker, a smartphone, a smart TV, a wearable device, or the like equipped with a Bluetooth (reception) module. Moreover, the data packet may include various types of data packets such as an audio streaming data packet, a video streaming packet, and the like. However, an embodiment is described in FIG. 1B as a data packet that the electronic device 10 transmits corresponds to an audio streaming data packet.

For example, in operation 11, the electronic device 10 may transmit a first audio streaming data packet to the external device 20. In the case where the external device 20 normally receives the first audio streaming data packet, the external device 20 may transmit a data reception confirm signal (e.g., an acknowledgement (ACK) signal illustrated in FIG. 1B) (hereinafter referred to as "ACK signal") to the electronic device 10 in operation 12. After receiving the ACK signal, the electronic device 10 may transmit, to the external device 20, a second audio streaming data packet that follows the first audio streaming data packet transmitted in operation 11 in operation 13.

However, the external device 20 may not receive the second audio streaming data packet that the electronic device 10 transmits. For example, the Bluetooth communication frequency bandwidth may be overlapped with a frequency bandwidth, which is used in another communication scheme (e.g., Wi-Fi), thus occurring the frequency interference. Due to the frequency interference, an error may be generated in the second audio streaming data packet, or a part of the second audio streaming data packet may be lost. Accordingly, the external device 20 may not transmit the ACK signal indicating that the external device 20 normally receives the second audio streaming data packet in operation 14.

If not receiving the ACK signal, in operation 15, the electronic device 10 may retransmit the second audio streaming data packet after a designated time (e.g., 3.75 ms) elapses. In operations 16 and 17, the electronic device 10 may repeatedly retransmit the second audio streaming data packet by a designated frequency until receiving a corresponding ACK signal. Afterwards, if the ACK signal corresponding to the transmission of the second audio streaming data packet is received in operation 18, the electronic device 10 may transmit, to the external device 20, a third audio streaming data packet following the second audio streaming data packet in operation 19.

As described with reference to FIG. 1A, a channel environment may worsen due to the frequency interference. Moreover, as described with reference to FIG. 1B, since the retransmission of the audio streaming data packet is continually repeated due to the degradation of the channel environment, the quality of audio may be degraded in the external device 20. For example, in the case where the external device 20 corresponds to a wireless Bluetooth headset, the choppy playback may begin to occur according to the transmission delay of the audio streaming data packet.

Figure 2:
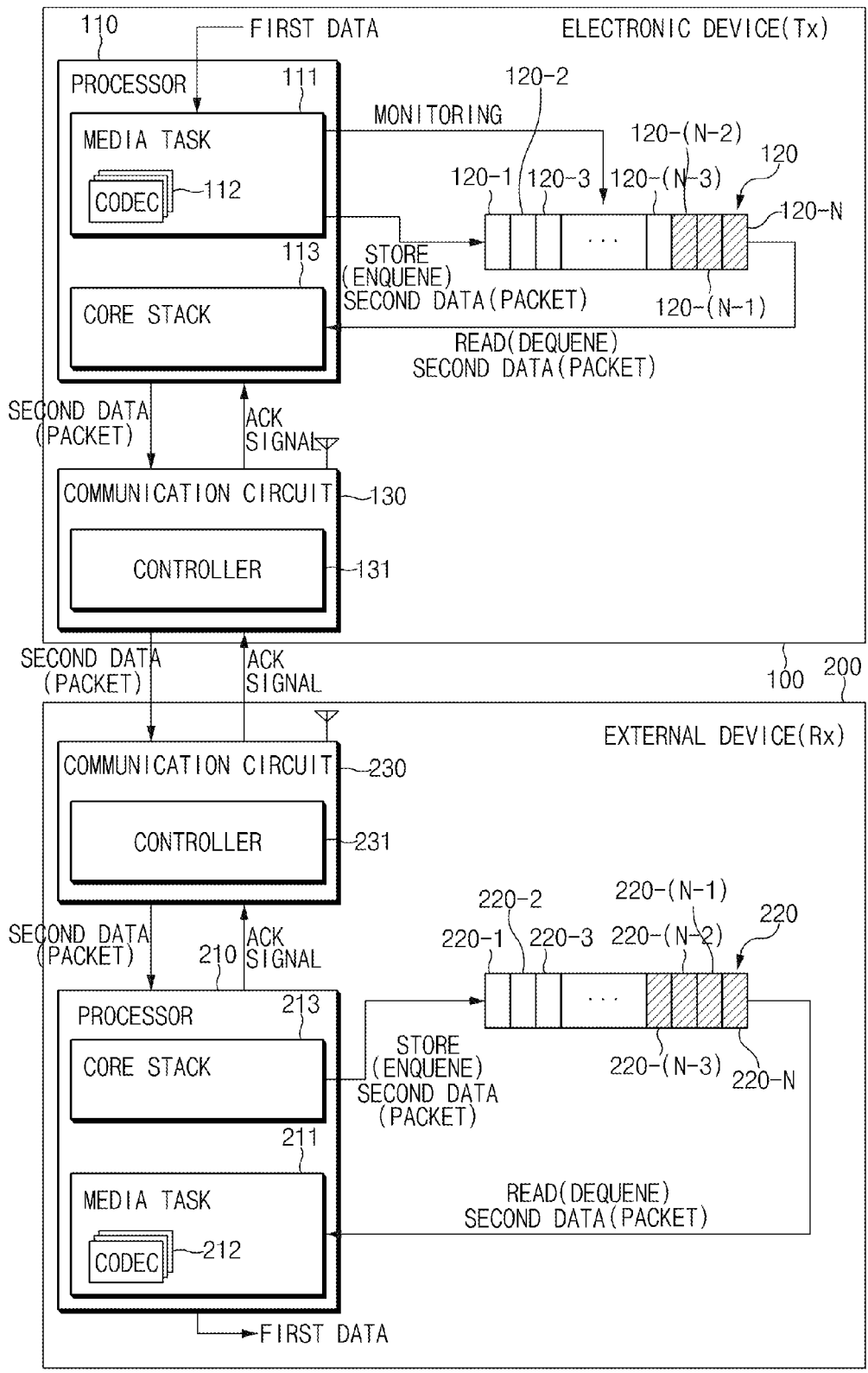
FIG. 2 is a block diagram illustrating an electronic device and an external device according to an embodiment of the present disclosure.

FIG. 2 is a block diagram illustrating an electronic device and an external device according to an embodiment of the present disclosure.

Referring to FIG. 2, a data transmitting method according to various embodiments of the present disclosure may be performed between the electronic device 100 and the external device 200. For example, the electronic device 100 and external device 200 may correspond to the electronic device 10 and the external device 20 illustrated in FIG. 1A, respectively.

The electronic device 100 may include a processor 110, a buffer 120, and a communication circuit 130. Although not illustrated in FIG. 2, the electronic device 100 may include various elements, which an electronic device 1401 illustrated in FIG. 14 or an electronic device 1501 illustrated in FIG. 15 includes, except the above-described elements.

The processor 110 may include a media task module 111 and a core stack module 113 that are implemented by software through interaction with a memory (not illustrated). A function and an operation to be performed in the media task module 111 and the core stack module 113 may be understood as being a function and an operation of the processor 110.

The processor 110 (or the media task module 111 thereof) according to various embodiments may generate second data by encoding first data based on an encoding parameter and may store the second data in the buffer 120. Moreover, the processor 110 (or the core stack module 113 thereof) may be configured to transmit the second data to the external device 200 through the communication circuit 130.

The first data that is data not encoded by the processor 110 may include, for example, pulse code modulation (PCM) data. The first data may include data about various contents, for example, audio streaming data, video streaming data, and the like. The first data may be obtained from an internal memory (not illustrated) included in the electronic device 100 or an external memory (not illustrated) coupled to the electronic device 100, or may be obtained from a server device (not illustrated), a cloud server (not illustrated), or the like connected over a network.

According to an embodiment, the first data may be inputted in the processor 110 (or the media task module 111 thereof) at a designated period. For example, in the case where the first data corresponds to audio streaming data, the designated period may be set to a value (e.g., 20 ms) that is capable of securing time taken to encode audio streaming data or guaranteeing real-time for audio streaming.

Meanwhile, the second data may correspond to data obtained by encoding the first data. The processor 110 (or the media task module 111 thereof) may generate the second data by encoding the first data based on an encoding parameter.

The processor 110 (or the media task module 111 thereof) may encode the first data by using a designated codec. The designated codec may correspond to, for example, one of a plurality of codecs 112 included in the media task module 111. Moreover, the encoding parameter may be included in various setting parameters of the designated codec.

The designated codec may be implemented with a codec, which is supported by the external device 200, based on negotiation executed when communication with the external device 200 is established. For example, when connecting to the external device 200 based on an advanced audio distribution profile (A2DP), the electronic device 100 may exchange codec information, which is supported by the electronic device 100 and the external device 200, with the external device 200. Afterwards, if communication between both devices is established, one codec that is supported in common by the both devices may be selected.

For example, the designated codec may include at least one of a subband codec (SBC), an aptX codec, a Samsung HD codec, an advanced audio coding (AAC) codec, or a LDAC for the Bluetooth communication. The designated codec is not limited to the exemplified codec. The designated codec may include various codecs that are developed by various manufacturers or are to be developed.

The processor 110 (or the media task module 111 thereof) according to an embodiment may monitor a remaining storage space of the buffer 120. For example, the processor 110 (or the media task module 111 thereof) may monitor the remaining storage space based on a queue count of the buffer 120. For example, in the case where the queue count is '0', the buffer 120 may be empty.

The processor 110 (or the media task module 111 thereof) according to an embodiment may be configured to change an encoding parameter based on the remaining storage space of the buffer 120. The encoding parameter may be included in a setting parameter of a codec that is used for encoding. For example, the encoding parameter may include a parameter associated with an encoding compression rate or transfer rate (e.g., a bitrate or a transfer speed), or the like. Generally, if an encoding compression rate increases, the transfer rate may decrease. If the encoding compression rate decreases, the transfer rate may increase.

For example, if the capacity of the remaining storage space of the buffer is greater than a designated value, the processor 110 may change a parameter associated with the encoding compression rate such that the encoding compression rate decreases. On the other hand, if the capacity of the remaining storage space of the buffer 120 is less than or equal to the designated value, the processor 110 may change the parameter associated with the encoding compression rate such that the encoding compression rate increases.

Parameters associated with the encoding compression rate or transfer rate may be different based on a type of codec used for encoding. For example, in the case where the codec used for encoding corresponds to the SBC, a parameter associated with the encoding compression rate or transfer rate may include a bitpool value or a sampling rate value.

The processor 110 (or the media task module 111 thereof) may packetize the encoded second data and may store (or enqueue) the packetized data in buffer 120. The second data stored in the buffer 120 will be described in FIG. 3.

The processor 110 (or the core stack module 113 thereof) may read (or dequeue) the second data thus encoded from the buffer 120 and may transmit the read second data to the communication circuit 130 (or a controller 131). For example, the processor 110 (or the core stack module 113 thereof) may read (or dequeue) the second data packet (e.g., a data packet stored in a queue space 120-N) of the highest priority stored in the buffer 120 based on a first in first out (FIFO) way.

According to an embodiment, when receiving an ACK signal (i.e., an ACK signal) from the external device 200, the processor 110 (or the core stack module 113 thereof) may read the second data thus encoded from the buffer 120. For example, as in FIG. 1B, the processor 110 (or the core stack module 113 thereof) may read data of the next priority from the buffer 120 only if receiving the ACK signal corresponding to the transmitted data.

The buffer 120 may be included in a memory of the electronic device 100. For example, the buffer 120 may be set by allocating at least a part of the memory thereto in response to the request of the processor 110. According to various embodiments of the present disclosure is described with reference to the term 'buffer'. However, according to various embodiments, the buffer 120 may be referred simply to as 'memory'. Moreover, according to various embodiments, the buffer 120 may be referred to as 'queue'. In this case, an operation in which data is stored in the buffer 120 in the FIFO way may be referred to as ' enqueue', and an operation in which data is read from the buffer 120 may be referred to as 'dequeue'.

The buffer 120 may include a plurality of queue spaces. For example, the buffer 120 may include queue spaces 120-1 to 120-N. Each of the queue spaces 120-1 to 120-N may store data (or a data packet), and the number of queue spaces 120-1 to 120-N in each of which data is stored may be referred to as 'queue count'.

For example, each of a queue space 120-(N−2), a queue space 120-(N−1), and a queue space 120-N of the buffer 120 may store data. The pieces of data may be stored in the buffer 120 in the order of times when the pieces of data are received from the media task module 111 of the processor 110, for example, in the order of the queue space 120-N, the queue space 120-(N−1), and the queue space 120-(N−2)) (queue count='3'). Moreover, the pieces of data stored in the buffer 120 may be read by the core stack module 113 of processor 110 in the order of times that the pieces of data are stored in the queue space 120-N, the queue space 120-(N−1), and the queue space 120-(N−2), respectively.

The second data that is encoded based on the first data may be packetized and stored in the buffer 120 according to an embodiment. That is, the second data may have a form of packet including a header.

Figure 3:
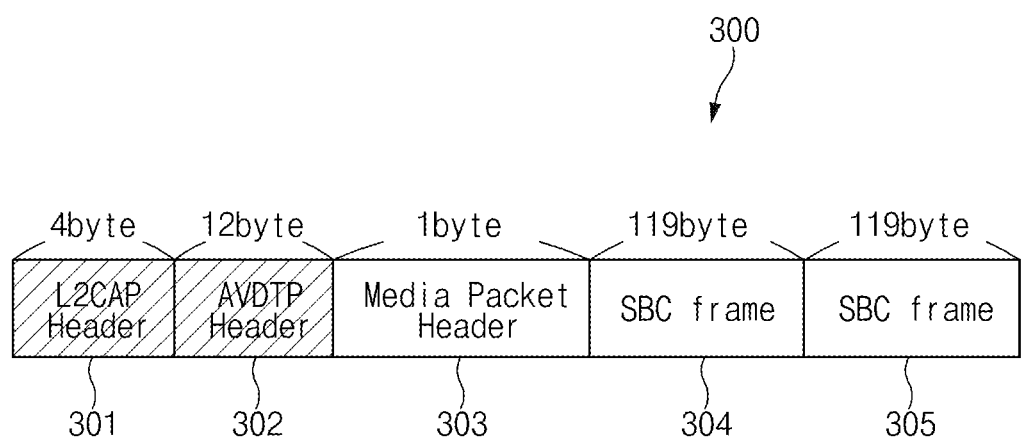
FIG. 3 is a view illustrating a packet obtained by encoding first data, according to an embodiment of the present disclosure.

FIG. 3 is a view illustrating a packet obtained by encoding first data, according to an embodiment of the present disclosure.

Referring to FIG. 3, for example, a packet 300 (hereinafter, referred to as 'second data packet') of the second data obtained by encoding the first data based on the SBC is illustrated. The second data packet 300 may include a header 301 according to a logical link control and adaptation protocol (L2CAP), a header 302 according to an audio/video distribution transport protocol (AVDTP), a media packet header 303, and SBC (data) frames 304 and 305. The media packet header 303 and the SBC frames 304 and 305 included in the second data packet 300 may be changed according to a type of codec used for encoding.

For example, the header 301 according to the L2CAP may have 4 bytes, the header 302 according to the AVDTP may have 12 bytes, and the media packet header 303 may have 1 byte. Moreover, each of the SBC frames 304 and 305 may have 119 bytes. According to various embodiments, if the second data packet 300 passes through a baseband stack (not illustrated) of the communication circuit 130 to be described below, a header (9 bytes) by the baseband stack may be added in front of the L2CAP header 301. Meanwhile, before the second data packet 300 is transmitted to the external device 200, a cyclic redundancy check (CRC) code, or the like may be added by the communication circuit 130 to the second data packet 300.

Returning to FIG. 2, the communication circuit 130 may communicate with the external device 200 based on a designated protocol. For example, the communication circuit 130 may transmit the second data, which is read from the buffer 120, to the external device 200. The communication circuit 130 may include, for example, the controller 131 that controls a function operation of the communication circuit 130.

According to an embodiment, the communication circuit 130 may correspond to a Bluetooth module, and the designated protocol may correspond to a Bluetooth protocol. For example, the Bluetooth protocol may include a hierarchy structure. A protocol stack according to the Bluetooth protocol may include a RF & baseband stack, a link manager stack, a host controller interface (HCI) stack, an L2CAP stack, a radio frequency communication (RFCOMM) stack, an application stack, and the like.

The Bluetooth module may be, but not limited to, an example of the communication circuit 130. The communication circuit 130 may correspond to at least one of a Bluetooth low energy (BLE) module, a wireless personal area network (WPAN) module according to IEEE 802.15 standard, a wireless local area network (WLAN) module, a Wi-Fi module according to IEEE 802.11 standard, a zig-bee module, a Z-wave module, an ANT module, or an ANT+ module.

Moreover, according to various embodiments, the communication circuit 130 may be implemented to include the processor 110 and the buffer 120 that are described above. In this case, the buffer 120 may be implemented with at least a part of a memory of the communication circuit 130 that is allocated according to the request of the processor 110.

The external device 200 may include elements that correspond to elements of the electronic device 100, for example, a processor 210, a buffer 220, and a communication circuit 230 of the external device 200 may correspond to the processor 110, the buffer 120, and the communication circuit 130 of the electronic device 100, respectively. Moreover, sub-elements included in the processor 210, the buffer 220, and the communication circuit 230 of the external device 200 may correspond to sub-elements included in the processor 110, the buffer 120, and the communication circuit 130 of the electronic device 100, respectively. The elements included in the external device 200 may correspond to the elements of the electronic device 100, respectively, and a duplicated description thereof is thus omitted.

According to an embodiment, in the case where the communication circuit 230 of the external device 200 receives the second data from the electronic device 100, the communication circuit 230 (or a controller 231) may transmit an ACK signal to the electronic device 100. The second data received from the electronic device 100 may be transmitted to the processor 210 (or the core stack module 213 thereof).

The processor 210 (or the core stack module 213 thereof) may receive the second data thus transmitted and may store (or enqueue) the second data in the buffer 220. Afterwards, the processor 210 (or a media task module 211 thereof) may read (or dequeue) the second data from the buffer 220, decoding the second data based on a codec 212. For example, the first data that is generated by decoding the second data may be processed by the processor 210 (e.g., audio streaming playback or video streaming playback) or may be stored in a memory not illustrated.

Figure 4:
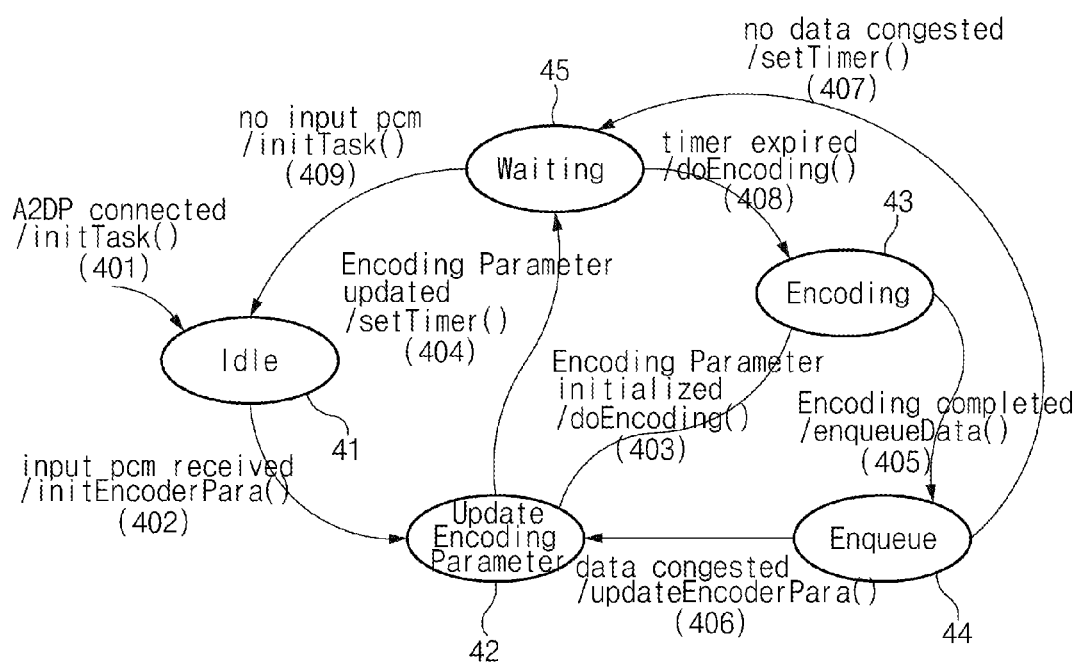
FIG. 4 is a state transition diagram of a media task according to an embodiment of the present disclosure.

FIG. 4 is a state transition diagram illustrating a media task according to an embodiment of the present disclosure.

Referring to FIG. 4, states of the media task module 111 included in the processor 110 may include an idle state 41, an update encoding parameter state 42, an encoding state 43, an enqueue state 44, and a waiting state 45. In FIG. 4, the electronic device will be described with reference to reference characters of FIG. 2.

In operation 401, the electronic device 100 may establish communication with the external device 200. For example, the electronic device 100 and an external device may be connected with each other based on the A2DP. In this case, the media task module 111 of the electronic device 100 may be in the idle state 41. The idle state 41 may be a state in which the first data (e.g., PCM data) to be encoded is not provided to the media task module 111 even though a communication channel is established between the electronic device 100 and the external device 200.

In operation 402, the media task module 111 may receive the first data (e.g., PCM data). The media task module 111 may transition from the idle state 41 to the update encoding parameter state 42 in response to receiving the first data.

In operation 403, the media task module 111 may initialize an encoding parameter of a codec used for encoding the first data. The media task module 111 in the encoding state 43 may generate second data by encoding the first data based on the encoding parameter set in the operation 403.

In operation 404, the media task module 111 may set a period (e.g., 20 ms) for updating an encoding parameter in a timer.

In operation 405, the media task module 111 may enqueue the second data, which is generated by encoding the first data, in the buffer 120 at the enqueue state 44. At the enqueue state 44, if a result of monitoring the buffer 120 at the media task module 111 indicates that the buffer 120 is congested, the media task module 111 may transition to the update encoding parameter state 42 in operation 406. On the other hand, if the monitoring result of the media task module 111 indicates that the buffer 120 is not congested, the media task module 111 may transition to the encoding parameter waiting state 45 in operation 407.

In operation 406, the media task module 111 may update an encoding parameter because the buffer 120 is determined as being congested.

In operation 407, the media task module 111 may set a period for updating the encoding parameter in a timer because the buffer 120 is determined as being not congested.

In operation 408, if the timer expires, the media task module 111 may transition from the waiting state 45 to the encoding state 43. In the encoding state 43, the media task module 111 may encode subsequent first data.

In operation 409, if the first data (e.g., PCM data) is not received within a designated time or if a connection with the external device 200 based on an A2DP is released, the media task module 111 may transition to the idle state 41.

Figure 5:
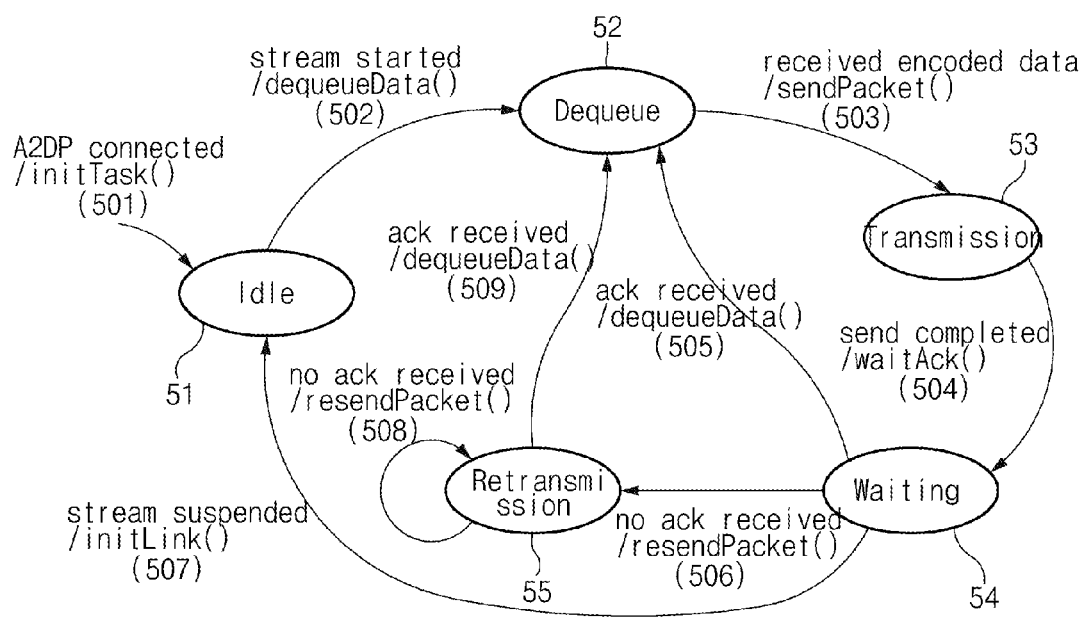
FIG. 5 is a state transition diagram illustrating a controller according to an embodiment of the present disclosure.

FIG. 5 is a state transition diagram illustrating a controller according to an embodiment of the present disclosure.

Referring to FIG. 5, a state of the controller 131 in the communication circuit 130 may include an idle state 51, a dequeue state 52, a transmission state 53, a waiting state 54, and a retransmission state 55. In FIG. 5, the electronic device is described with reference to reference characters of FIG. 2.

In operation 501, the electronic device 100 may establish communication with the external device 200. For example, the electronic device 100 and the external device 200 may be connected with each other based on the A2DP. In this case, the controller 131 of the communication circuit 130 may be in the idle state 51. The idle state 51 may mean a state in which data is not streamed after communication is established between the electronic device 100 and the external device 200.

In operation 502, if data streaming starts, the controller 131 may transition from the idle state 51 to the dequeue state 52. The controller 131 in the dequeue state 52 may dequeue encoded second data stored in the buffer 120 through the core stack module 113.

In operation 503, the controller 131 may transition from the dequeue state 52 to the transmission state 53. The controller 131 may transmit the encoded second data received from the core stack module 113 to the external device 200.

In operation 504, after the controller 131 transmits the encoded second data to the external device 200, the controller 131 may transition from the transmission state 53 to the waiting state 54. In the waiting state 54, the controller 131 may wait for an input of an ACK signal corresponding to transmission of the second data.

In operation 505, if the ACK signal corresponding to transmission of the second data is received, the controller 131 may transition to the dequeue state 52. The controller that transitions to the dequeue state 52 may again perform operations after operation 503.

In operation 506, if the ACK signal corresponding to the transmission of the second data is not received, the controller 131 may transition to the retransmission state 55.

In operation 507, if the transmission (or streaming) of the second data is interrupted or delayed, the controller 131 may transition to the idle state 51. In this case, a communication connection with the external device 200 may be initialized.

In operation 508, the controller 131 may not receive the ACK signal while maintaining the retransmission state 55. Accordingly, the controller 131 may retransmit the second data after a designated time (e.g., 3.75 ms) elapses.

In operation 509, if the controller 131 receives the ACK signal corresponding to the retransmission of the second data, the controller 131 may transition to the dequeue state 52 and may perform operations after operation 503.

Figure 6:
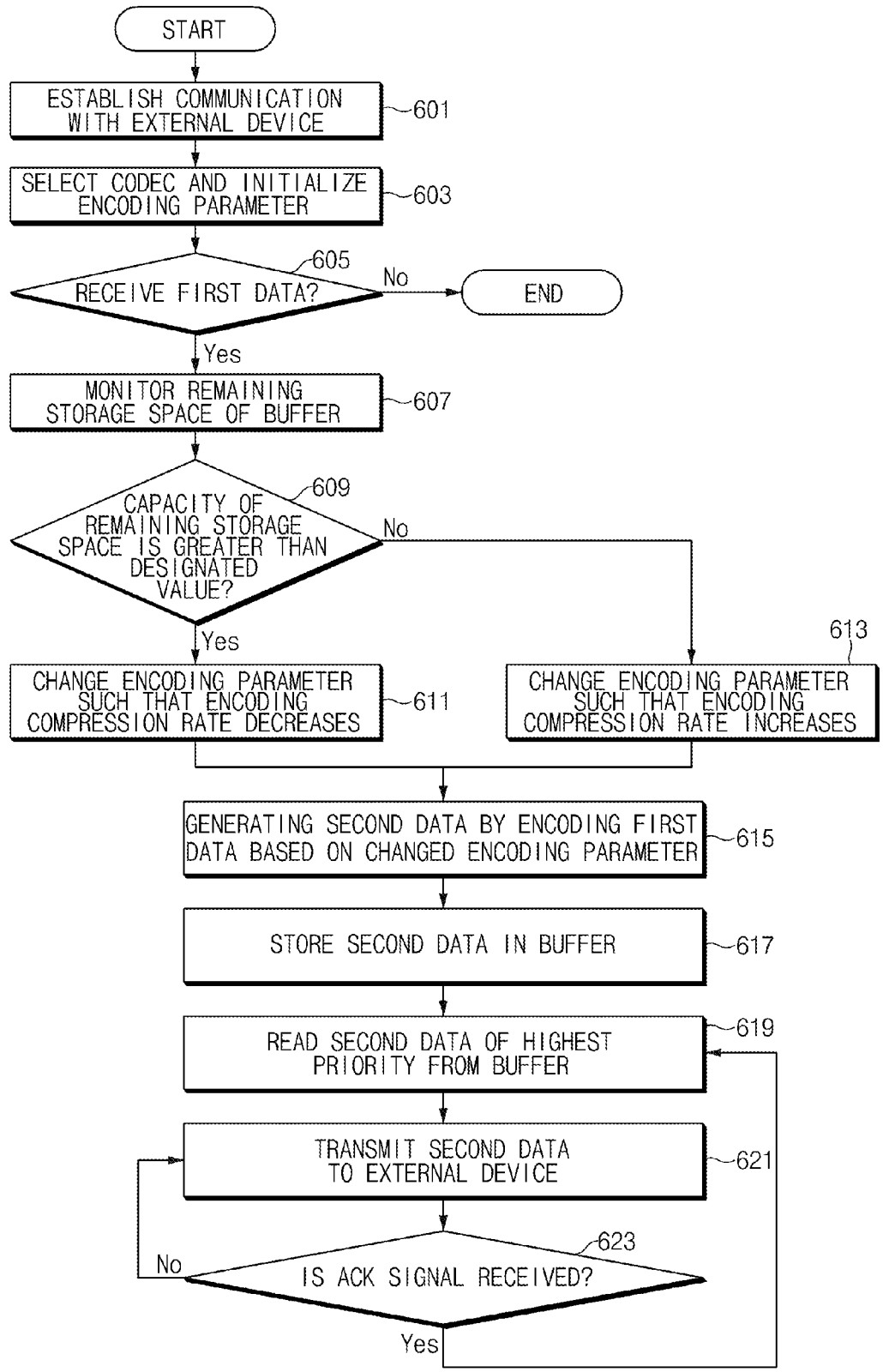
FIG. 6 is a flowchart illustrating a data transmission method according to an embodiment of the present disclosure.

FIG. 6 is a flowchart illustrating a data transmission method according to an embodiment of the present disclosure.

Referring to FIG. 6, the data transmission method according to an embodiment of the present disclosure may include operations 601, 603, 605, 607, 609, 611, 613, 615, 617, 619, 621, and 623. The data transmission method illustrated in FIG. 6 may be described with reference to reference symbols of FIG. 2.

In operation 601, the electronic device 100 may establish a communication connection with an external device through the embedded communication circuit 130. According to an embodiment, the electronic device 100 may perform negotiation for the communication connection in operation 601. For example, in operation 601, the electronic device 100 and the external device 200 may exchange codec information supported by both devices when connecting with each other based on the A2DP.

In operation 603, the processor 110 of the electronic device 100 may select a codec supported by the external device 200 as a codec used for encoding based on the exchanged codec information. That is, the selected codec may correspond to a codec which is supported in common by the electronic device 100 and the external device 200. Furthermore, in operation 603, the processor 110 of the electronic device 100 may initialize an encoding parameter of the codec. The encoding parameter may include, for example, a parameter associated with an encoding compression rate.

In operation 605, the processor 110 of the electronic device 100 may determine whether first data is received (or acquired). If the first data is received, the procedure proceeds to operation 607. Otherwise, the method ends. According to an embodiment, the first data may correspond to PCM data and may be received periodically (e.g., 20 ms).

In operation 607, the processor 110 of the electronic device 100 may monitor a remaining storage space of the embedded buffer 120. For example, the electronic device 100 may monitor the remaining storage space based on a queue count of the buffer 120.

In operation 609, the processor 110 of the electronic device 100 may determine whether a capacity of the remaining storage space of the buffer 120 is greater than a designated value. The processor 110 may change an encoding parameter based on the remaining storage space of the buffer 120. The encoding parameter may be included in the encoding setting parameter of the codec selected in operation 603. For example, the encoding parameter may include a parameter for determining an encoding compression rate. For example, the parameter associated with the encoding compression rate may include a bitpool value or a sampling rate value.

In operation 611, if the capacity of the remaining storage space of the buffer 120 is greater than the designated value, the processor 110 of the electronic device 100 may change a parameter (e.g., a bitpool value and a sampling rate value) associated with the encoding compression rate such that the encoding compression rate decreases.

In operation 613, if the capacity of the remaining storage space of the buffer 120 is less than or equal to the designated value, the electronic device 100 may change a parameter associated with the encoding compression rate such that the encoding compression rate increases.

In operation 615, the processor 110 of the electronic device 100 may encode first data by using the codec selected in operation 603 based on the encoding parameter changed in operation 611 or 613. Second data may be generated according to the encoding. The designated codec may include various codecs, such as a SBC, an aptX codec, a Samsung HD codec, an AAC codec, LDAC, and the like for Bluetooth communication.

In operation 617, the processor 110 of the electronic device 100 may store (or enqueue) the second data in the buffer 120. For example, the electronic device 100 may packetize and store the second data. In this case, a header of the packetized second data may include a header according to L2CAP or AVDTP.

In operation 619, the processor 110 of the electronic device 100 may read (or dequeue) the second data from the buffer 120 in the FIFO way. For example, the processor 110 may dequeue the second data that is stored in a queue space of the highest priority in the buffer 120.

In operation 621, the communication circuit 130 of the electronic device 100 may transmit the read (or dequeued) second data to the external device 200. For example, the second data may be transmitted through a Bluetooth communication channel.

In operation 623, the processor 110 of the electronic device 100 may determine whether an ACK signal is received from the external device 200. If the ACK signal is received, the procedure may return to operation 619 and may again read the second data of the highest priority from the buffer 120. In contrast, if the ACK signal is not received within a designated time, the procedure returns to operation 621, and transmit again the read second data.

Figure 7:
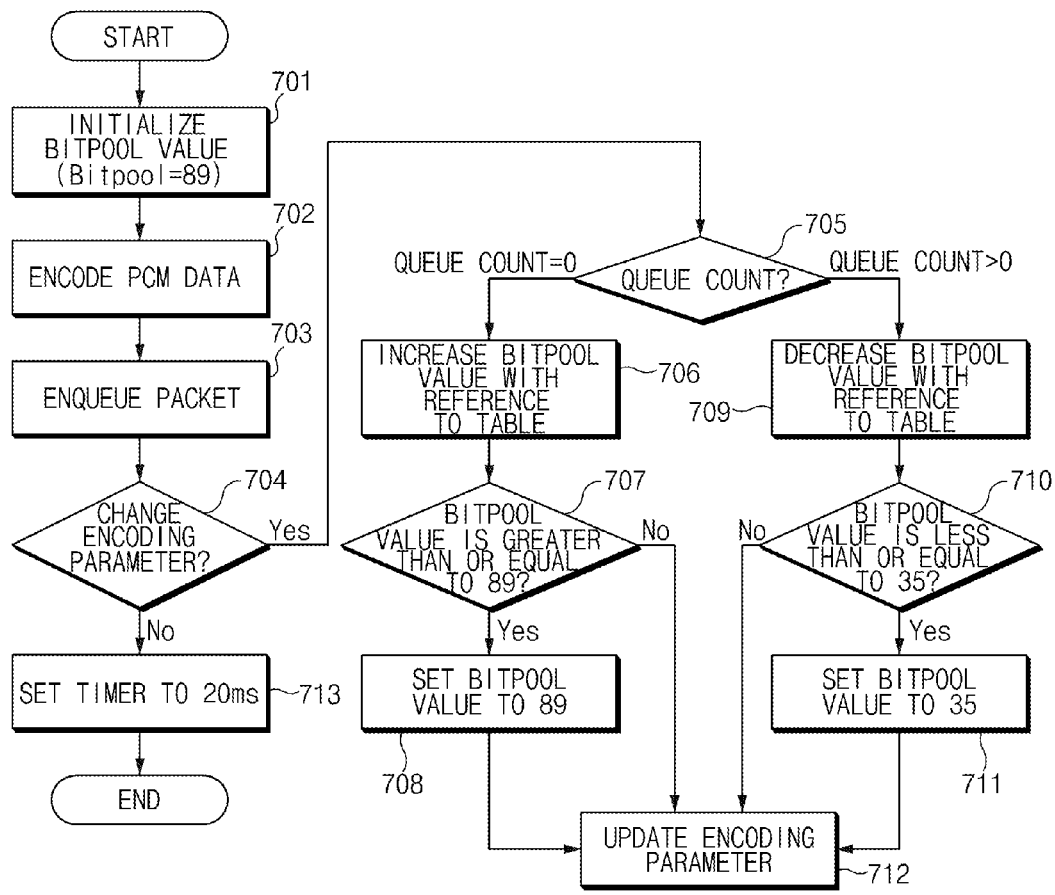
FIG. 7 is a flowchart illustrating an audio streaming data transmitting method according to an embodiment of the present disclosure.

FIG. 7 is a flowchart illustrating an audio streaming data transmitting method according to an embodiment of the present disclosure.

Referring to FIG. 7, the audio streaming data transmitting method according to an embodiment of the present disclosure may include operations 701 to 713. The audio streaming data transmitting method illustrated in FIG. 7 will be described with reference to reference numerals of FIG. 2. Furthermore, in the audio streaming data transmitting method illustrated in FIG. 7, it is described that a codec used for encoding is the SBC codec and the number of queue spaces of the buffer 120 is eighteen.

In operation 701, the processor 110 of the electronic device 100 may initialize a bitpool value as an encoding parameter. For example, the processor 110 may set the bitpool value to '89'.

In operation 702, the processor 110 of the electronic device 100 may generate an audio streaming data packet (i.e., a second data packet) by encoding and packetizing sound source PCM data (first data) received based on the bitpool value.

In operation 703, the processor 110 of the electronic device 100 may enqueue the audio streaming data packet into the buffer 120.

In operation 704, the processor 110 of the electronic device 100 may determine whether to change an encoding parameter, that is, the bitpool value. In the case of changing the bitpool value, the processor 110 may proceed to operation 705. In contrast, in the case of not changing the bitpool value, the procedure may proceed to operation 713.

In operation 705, the processor 110 of the electronic device 100 may monitor the buffer 120, determining whether a queue count is '0' or is greater than '0'. If the queue count is '0', the procedure may proceed to operation 706. If the queue count is greater than '0', the procedure may proceed to operation 709.

In operation 706, because the queue count is '0', the processor 110 of the electronic device 100 may increase the bitpool value with reference to a policy table.

FIG. 8 illustrates a bitpool update policy table according to an embodiment of the present disclosure.

Referring to FIG. 8, in the case where a queue count is updated from a value to '0', the processor 100 may increase a bitpool value by '1'. Furthermore, for example, in the case where the queue count of '0' is maintained from an end of a timer to 80 ms, the processor 110 may increase the bitpool value by '2'.

That the queue count is '0' may mean that a space for storing an encoded audio streaming data packet is sufficient because all queue spaces of the buffer 120 are empty. This may mean that the transmission of an audio streaming data packet and an ACK signal corresponding thereto are well transmitted and received because the state of a communication is in a good condition. The reason may be that the enqueued audio streaming data packet is accumulated in the buffer 120 since it is impossible to read the audio streaming data packet from the buffer 120 if the ACK signal is not received from the external device 200.

Therefore, in the case where the queue count is '0', the processor 110 may increase the transfer rate (or the transfer speed) of the audio streaming data packet by increasing the bitpool value (i.e., encoding parameter). In other words, an audio streaming service of high sound quality may be achieved.

In operation 707, the processor 110 of the electronic device 100 may determine whether the bitpool value increased in operation 706 is greater than or equal to a designated value (e.g., 89). If the increased bitpool value is greater than or equal to 89, the processor 110 may set the bitpool value to 89 in operation 708. In contrast, if the bitpool value increased in operation 706 is less than a designated value (e.g., 89), the processor 110 may accept the increased bitpool value. That is, the bitpool value may be limited to a maximum of 89 through operations 707 and 708.

In operation 709, since the queue count is greater than '0', the processor 110 of the electronic device 100 may decrease, for example, the bitpool value with reference to the bitpool update policy table illustrated in FIG. 8.

Referring to FIG. 8, in the case where a queue count increases by '2' for 40 ms, the processor 100 may decrease the bitpool value by '1'. Further, for example, in the case where a queue count continuously increases by 2 every 40 ms, the processor 100 may decrease the bitpool value by '2'. Furthermore, in the case where the queue count indicates a maximum (queue count=18), the processor 110 may set the bitpool value to a minimum value.

In the case where the queue count is not '0', at least a part of queue spaces of the buffer 120 may store an audio streaming data packet. This may mean that the packet transmission is being delayed since the electronic device 100 does not receive the ACK signal due to unstable communication situation. The reason may be that the enqueued audio streaming data packet is accumulated in the buffer 120 since it is impossible to read the audio streaming data packet from the buffer 120 if the ACK signal is not received from the external device 200.

Therefore, when the queue count is greater than '0', the processor 110 may reduce the transfer rate (or the transfer speed) of the audio streaming data packet by reducing the bitpool value (or the encoding parameter). In other words, a choppy playback-free audio streaming service may be achieved.

In operation 710, the processor 110 of the electronic device 100 may determine whether the bitpool value increased in operation 709 is less than or equal to a designated value (e.g., 35). If the decreased bitpool value is less than or equal to 35, the processor 110 may set the bitpool value to 35 in operation 711. In contrast, if the bitpool value decreased in operation 709 exceeds a designated value (e.g., 35), the processor 110 may confirm the decreased bitpool value. That is, the bitpool value may be limited to a minimum of 35 through operations 710 and 711.

In operation 712, the processor 110 of the electronic device 100 may update the bitpool value (encoding parameter) increased or decreased through operations 705 to 711 and may set the updated bitpool value in the processor 110.

To receive the next PCM data (i.e., the first data), in operation 713, the processor 110 of the electronic device 100 may set a timer to 20 ms. An embodiment is exemplified in FIG. 7 as the streaming method is ended after operation 713. However, operations 702 to 713 may be performed again if a time of 20 ms elapses.

An electronic device of the related art may execute an encoding using a fixed encoding parameter without consideration of a real channel environment. Accordingly, the sound quality of the electronic device of the related art may deteriorate by excessively reducing a transfer speed even in a stable channel environment or transmitting a packet at high transfer speed even in a deteriorated channel environment. For this reason, a packet error, a packet loss, and a packet delay may be frequently generated at a transmitter side.

However, according to various embodiments of the present disclosure, a channel environment may be considered based on the remaining storage space of the buffer 120 of the electronic device 100. The electronic device 100 according to various embodiments of the present disclosure may consider the channel environment by monitoring the remaining storage space of the buffer 120 and may change an encoding parameter based on the monitoring result.

The electronic device 100 may adjust the compression rate and a transfer speed (or a transfer rate) of data transmitted in the channel environment by changing the encoding parameter in real time. In other words, the electronic device 100 may set an optimum encoding parameter corresponding to the channel environment changing in real time, thereby making it possible to reduce a decrease in the sound quality caused during encoding processing and to reduce a packet error, loss, and delay generated at a transmitter side.

Figure 9A:
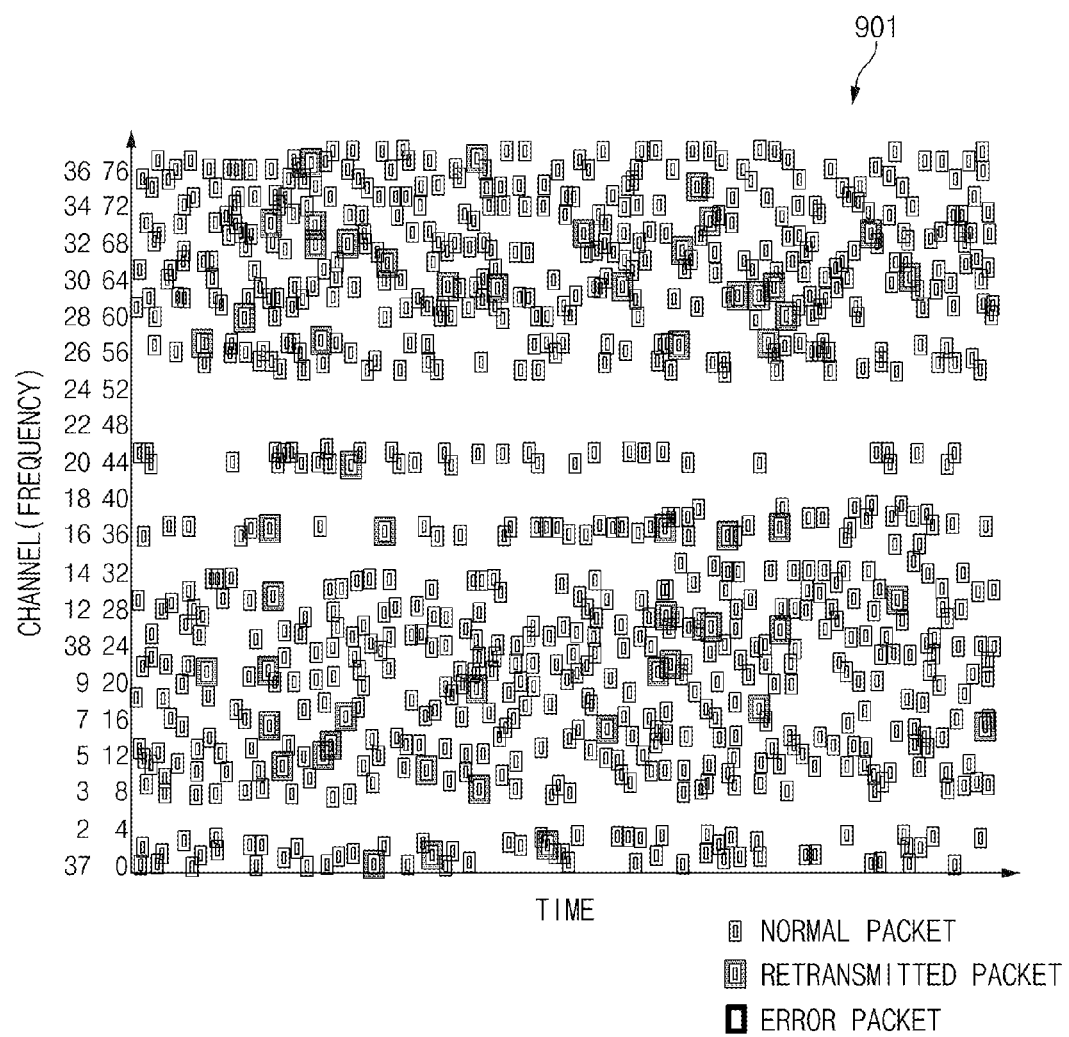
FIG. 9A is a graph illustrating Bluetooth channel information measured in a shield-room, according to an embodiment of the present disclosure.

FIG. 9A is a graph illustrating Bluetooth channel information measured in a shield-room according to an embodiment of the present disclosure.

Referring to FIG. 9A, Bluetooth channel information 901 may correspond to channel information of Bluetooth communication that is performed between an electronic device and an external device located in the shield-room. In the Bluetooth channel information 901, a normal packet, a retransmitted packet, and an error packet are illustrated according to time. The shield-room may be a space shielded from an external radio wave. Therefore, an electronic device according to the related art and an external device may perform Bluetooth communication without the influence of other radio communications.

The Bluetooth channel information 901 may indicate that 61 channels of a total of 79 Bluetooth channels are effective. Furthermore, it is understood that most audio streaming data packets are normally transmitted or retransmitted. In the case where the channel environment is in a good condition, audio may be played back without the choppy playback even though a speed in which an audio streaming data packet is transmitted increases.

Figure 9B:
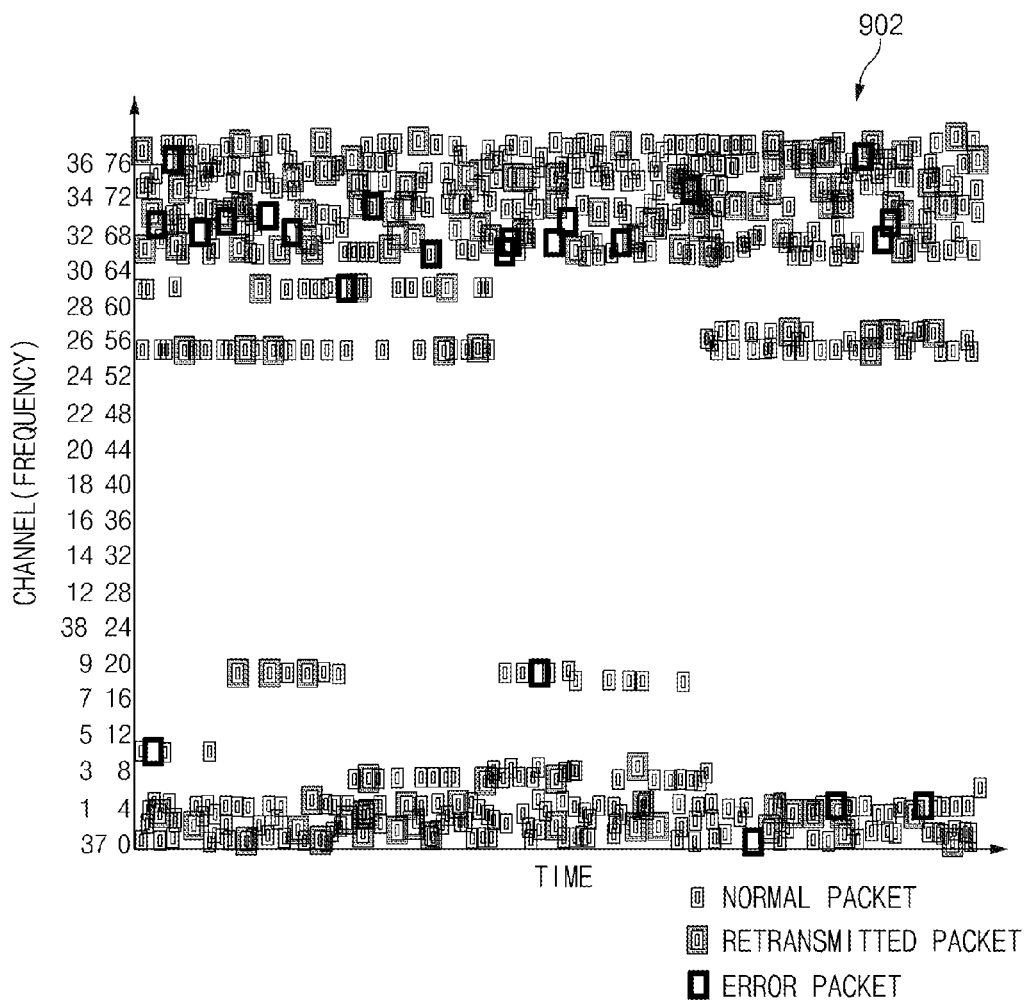
FIG. 9B is a graph illustrating Bluetooth channel information measured in a general office, according to an embodiment of the present disclosure.

FIG. 9B is a graph illustrating Bluetooth channel information measured in a general office, according to an embodiment of the present disclosure.

Referring to FIG. 9B, Bluetooth channel information 902 may correspond to channel information of Bluetooth communication that is performed between an electronic device and an external device that are located in a general office. In the Bluetooth channel information 902, a normal packet, a retransmitted packet, and an error packet are illustrated according to time. Third external devices in the general office may download a file through the Wi-Fi communication, may search for a device through the BLE technology, or may transmit a file to any other device(s) based on an object push profile (OPP).

The Bluetooth channel information 902 may indicate that 20 channels among 79 Bluetooth channels are effective because of the radio frequency interference from the third external devices which affecting the Bluetooth channels. Furthermore, it is understood that most audio streaming data packets are retransmitted packets and the considerable number of error packets exists.

As such, the Bluetooth channel width may be severely limited due to the frequency interference by the third external devices. Furthermore, in the case where audio streaming is made, the choppy playback may frequently occur.

Figure 10:
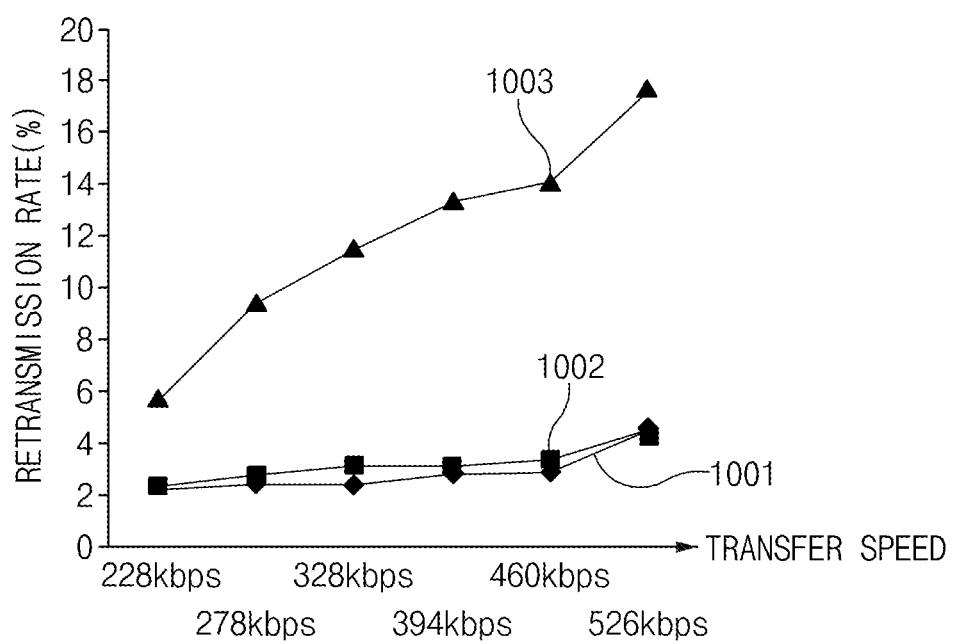
FIG. 10 is a graph illustrating a packet retransmission rate according to a transfer rate measured in various environments according to an embodiment of the present disclosure.

FIG. 10 is a graph illustrating a packet retransmission rate according to a transfer rate measured in various environments according to an embodiment of the present disclosure.

Referring to FIG. 10, a packet retransmission rate graph 1001 may indicate that when receding from each other by 75 cm, an electronic device and an external device perform Bluetooth communication in a shield-room. Furthermore, a packet retransmission graph rate 1002 may indicate that when receding from each other by 150 cm, an electronic device and an external device perform Bluetooth communication in a shield-room. A packet retransmission rate graph 1003 may indicate that when receding from each other by 150 cm, an electronic device and an external device perform Bluetooth communication in an office.

According to the packet retransmission rate graphs 1001 and 1002, it is understood that there is no meaningful change in packet retransmission rate within a distance of about 1 to 2 m. However, according to the packet retransmission rate graphs 1002 and 1003, there may be a significant difference in a retransmission rate. Furthermore, according to the graph 1003, it is understood that the retransmission rate sharply increases as the transfer speed (or transfer rate) increases. As a result, it is understood that the data packet transmission using Bluetooth communication is affected by a channel environment, such as external frequency interference, and the like.

TABLE 1

|  | Experiment 1 according to the related art (in the case of FIGS. 11A and 12A) | Experiment 2 according to an embodiment of the present disclosure (in the case of FIGS. 11B and 12B) |
|---|---|---|
| Test environment | An office (including a frequency interference by the third external device) | |
| Distance between devices | Within 23 m (moving an external device) | |
| Bitrate (Kbps) | 526 | 526 |
| No Error | 8400 | 9102 |
| Header Error | 88 | 55 |
| Payload/CRC Error | 55 | 231 |
| Retransmitted Packets | 3212 | 2608 |
| Total Retransmitted Counts | 6244 | 4141 |
| Avg Retransmitted Counts | 1.943960149 | 1.587806748 |
| Total Packets | 14787 | 13529 |
| Retransmitted Rate (%) | 42.22627984 | 30.60832286 |

Table 1 is an experimental result of the quality of Bluetooth communication between an electronic device and an external device in a general office. Experimental data of experiment 1 according to the related art and experimental data of experiment 2 according to an embodiment of the present disclosure are measured in the same environment. For example, an audio streaming data packet is transmitted from the electronic device (i.e., a transmitter side) to an external device (i.e., a receiver side) at a transfer speed of 526 kbps. Furthermore, the external device recedes from the electronic device at an average speed of 12.8 cm/s.

According to Table 1, an average packet retransmission rate according to technology of the related art is measured as 42.2%, and an average packet retransmission rate according to the present disclosure is measured as 30.6%. According to an embodiment of the present disclosure, the average packet retransmission rate may decrease by 11.6%, compared with the related art.

Figure 11A:
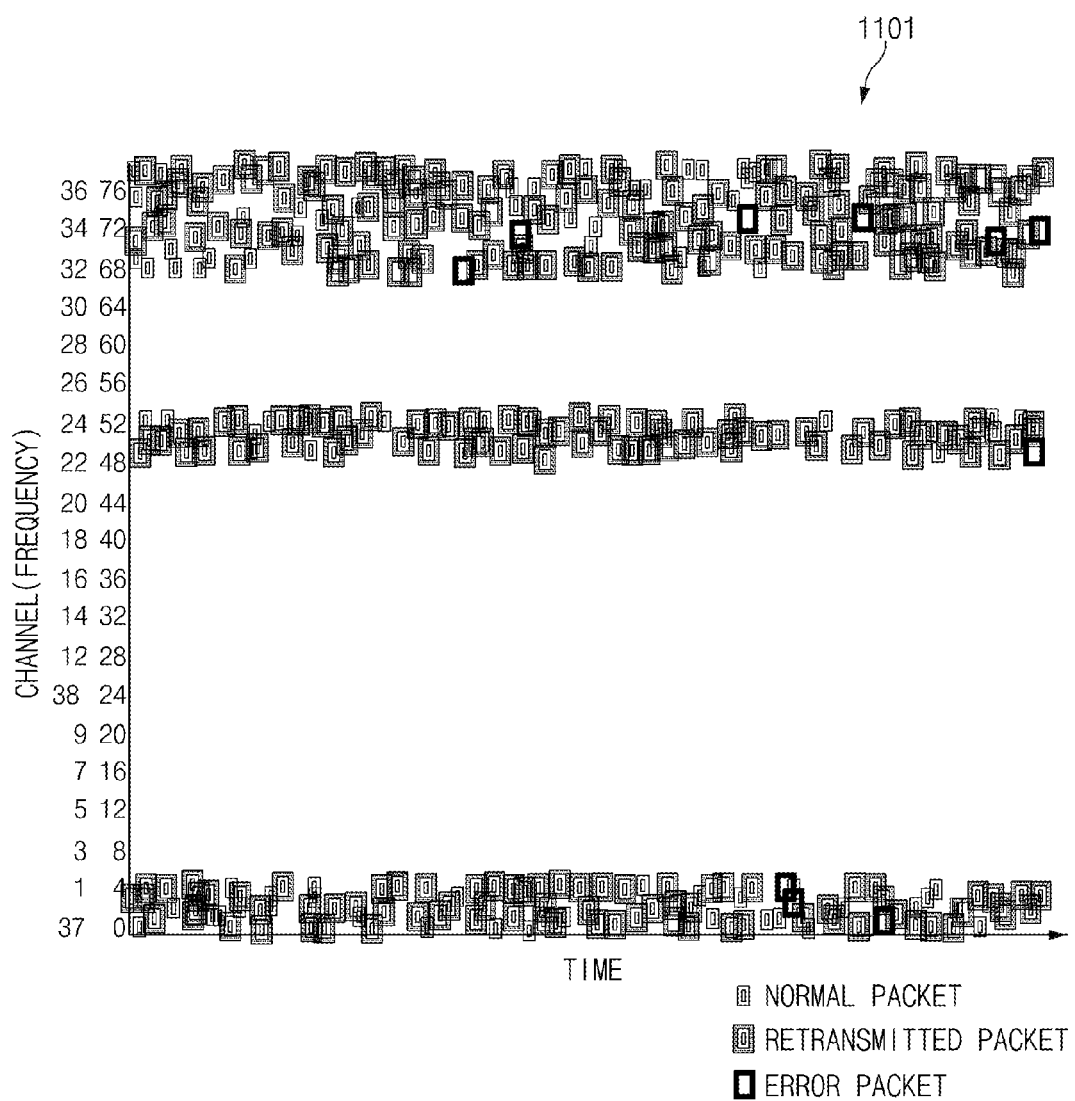
FIG. 11A is a graph illustrating Bluetooth channel information according to the related art.

FIG. 11A is a graph illustrating Bluetooth channel information according to the related art.

Referring to FIG. 11A, Bluetooth channel information 1101 according to the related art measured in a general office may indicate that 20 channels of a total of 79 Bluetooth channels are effective due to the frequency interference by third external devices.

Figure 11B:
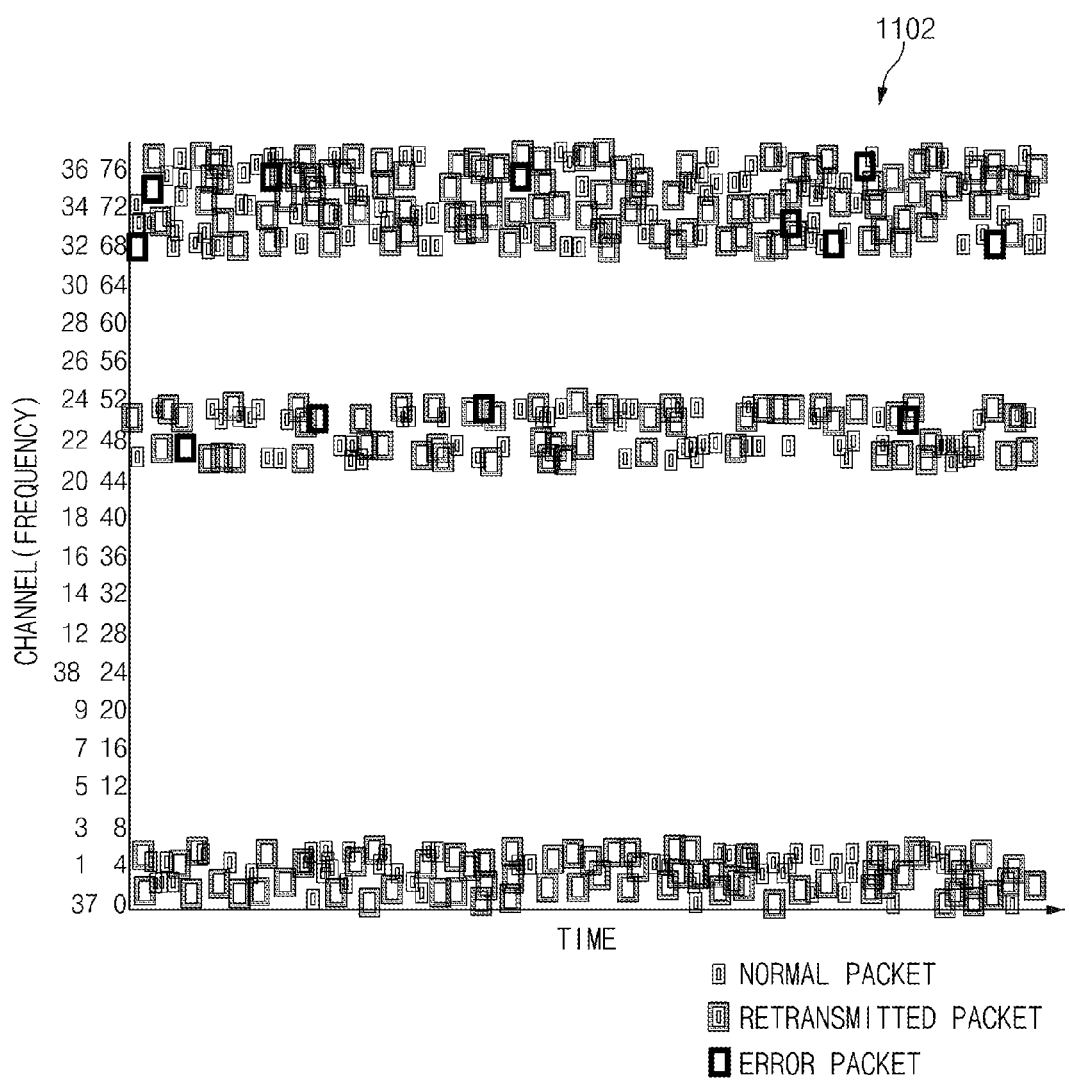
FIG. 11B is a graph illustrating Bluetooth channel information according to an embodiment of the present disclosure.

FIG. 11B is a graph illustrating Bluetooth channel information according to an embodiment of the present disclosure.

Referring to FIG. 11B, Bluetooth channel information 1102 according to an embodiment of the present disclosure may indicate that 20 channels of a total of 79 Bluetooth channels are effective due to the frequency interference by third external devices. However, it is understood from the Bluetooth channel information 1102 of FIG. 11B that the number of retransmitted packets decreases compared with the Bluetooth channel information 1101 of FIG. 11A.

Figure 12A:
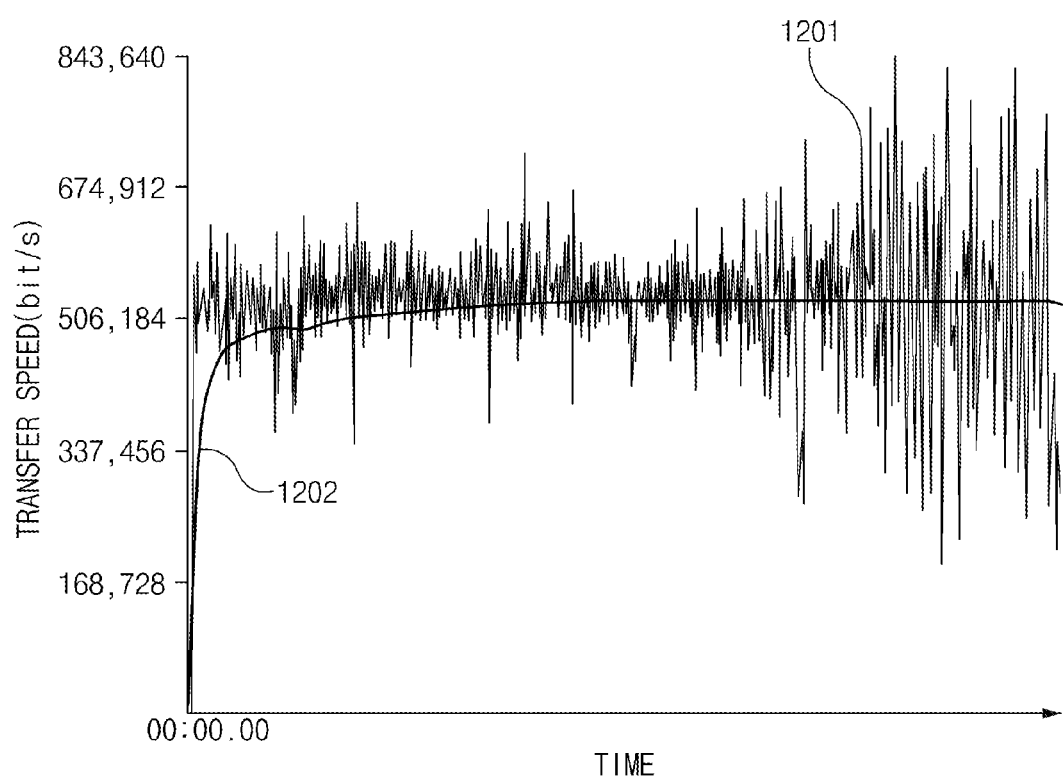
FIG. 12A is a graph illustrating a transfer speed of Bluetooth communication according to an embodiment of the present disclosure.

FIG. 12A is a graph illustrating a transfer speed of Bluetooth communication according to an embodiment of the present disclosure.

Referring to FIG. 12A, a graph 1201 may indicate a real-time transfer speed according to time, and a graph 1202 may indicate an average transfer speed. As time elapses, a distance between an electronic device and an external device increase.

According to the graph 1201, at the beginning of the transmission, a real-time transfer speed is not almost change because the devices are close to each other. However, it is understood that the change of the real-time transfer speed severely fluctuates if the distance between devices increases as time elapses. The sudden change in the real-time transfer speed may indicate that a packet error, a packet loss, or a packet delay is severely generated while transmitting audio streaming data packets. According to an experimental result, when devices are spaced apart by 23 m, the choppy playback may begin to occur at the external device (Experiment 1 of Table 1).

Figure 12B:
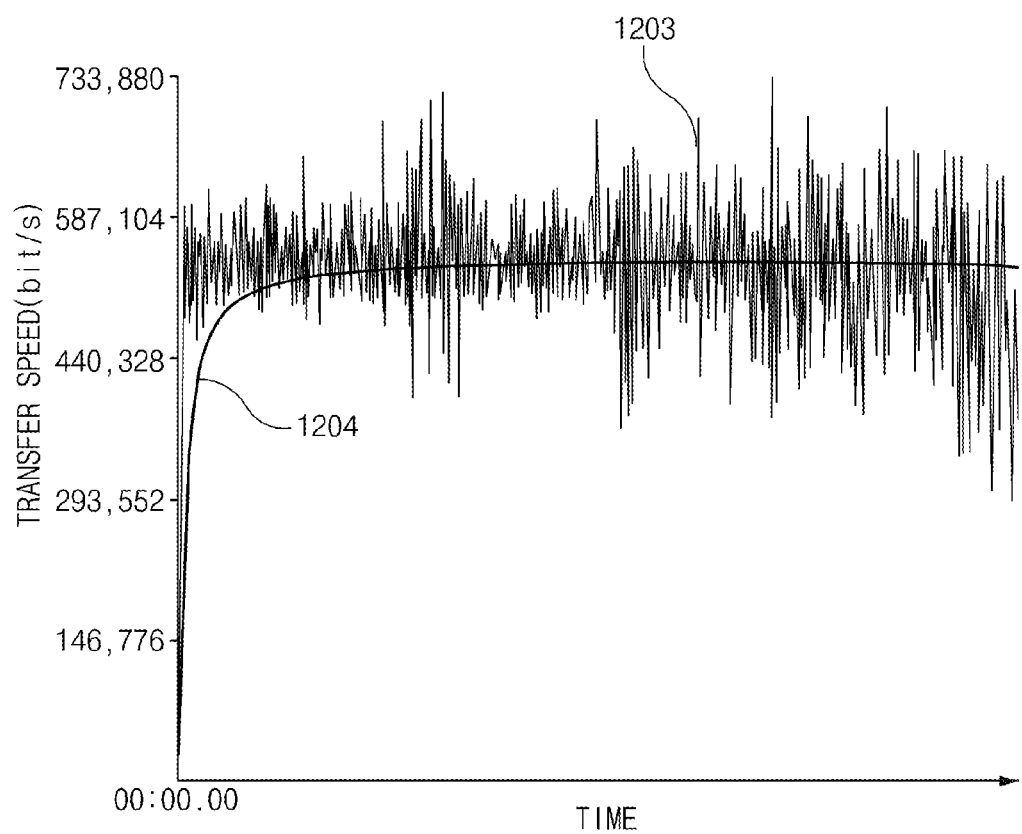
FIG. 12B is a graph illustrating a transfer speed of Bluetooth communication according to an embodiment of the present disclosure.

FIG. 12B is a graph illustrating a transfer speed of Bluetooth communication according to an embodiment of the present disclosure.

Referring to FIG. 12B, a graph 1203 may indicate a real-time transfer speed according to time, and a graph 1204 may indicate an average transfer speed. As illustrated in FIG. 12A, as time elapses, a distance between an electronic device and an external device increases.

According to the graph 1203, it is understood that a real-time transfer speed varies within a fixed width. Furthermore, an average transfer speed may be nearly unchangeably maintained. In addition, according to an experimental result, the choppy playback may not occur even though the external device recedes from the electronic device by at least 23 m (Experiment 2 of Table 1).

Figure 13:
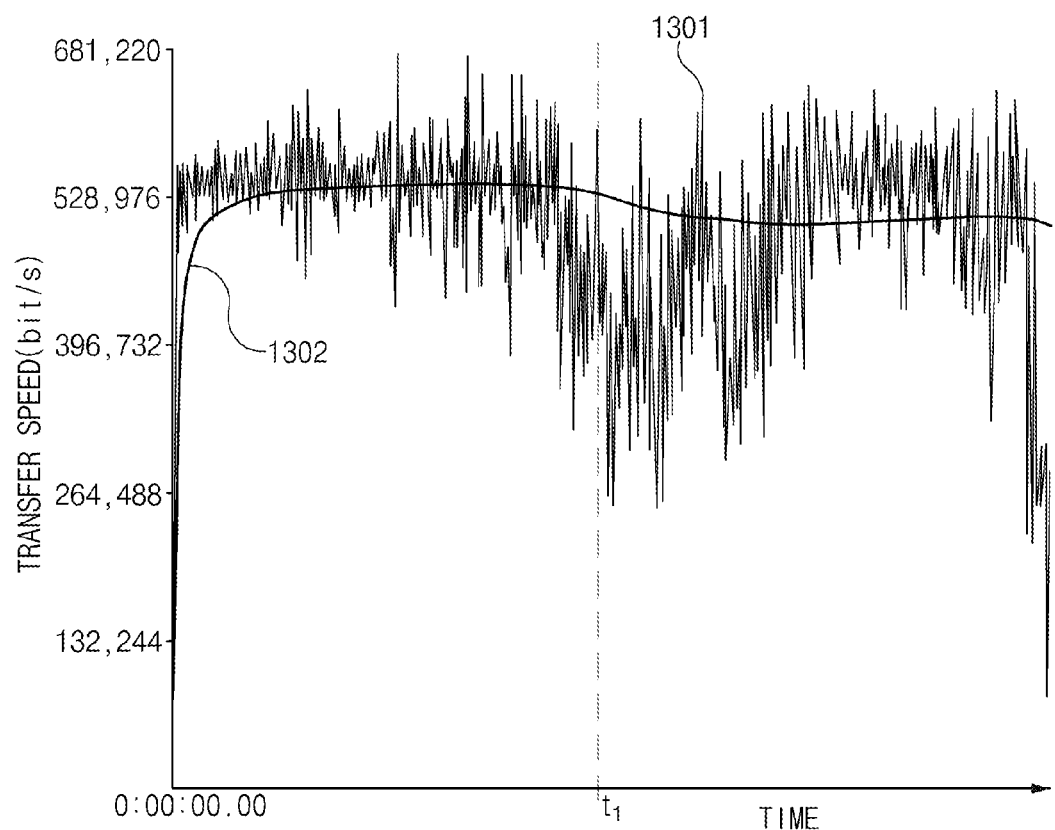
FIG. 13 a graph illustrating a transfer speed of Bluetooth communication according to an embodiment of the present disclosure.

FIG. 13 is a graph illustrating a transfer speed of Bluetooth communication according to an embodiment of the present disclosure.

Referring to FIG. 13, a graph 1301 may indicate a real-time transfer speed according to a time, and a graph 1302 may indicate an average transfer speed. As illustrated in FIG. 13, as time elapses, an external device may recede from an electronic device. Even though the external device recedes by 23 m from the electronic device at time t1, the choppy playback may not occur (Experiment 2 of Table 1). The choppy playback may begin to occur when the external device is placed apart from the electronic device by 53 m. Compared with the related art, a distance between an external device and an electronic device where the choppy playback begins to occur may be increased by 30 m (increase 2.3 times compared with the related art).

Figure 14:
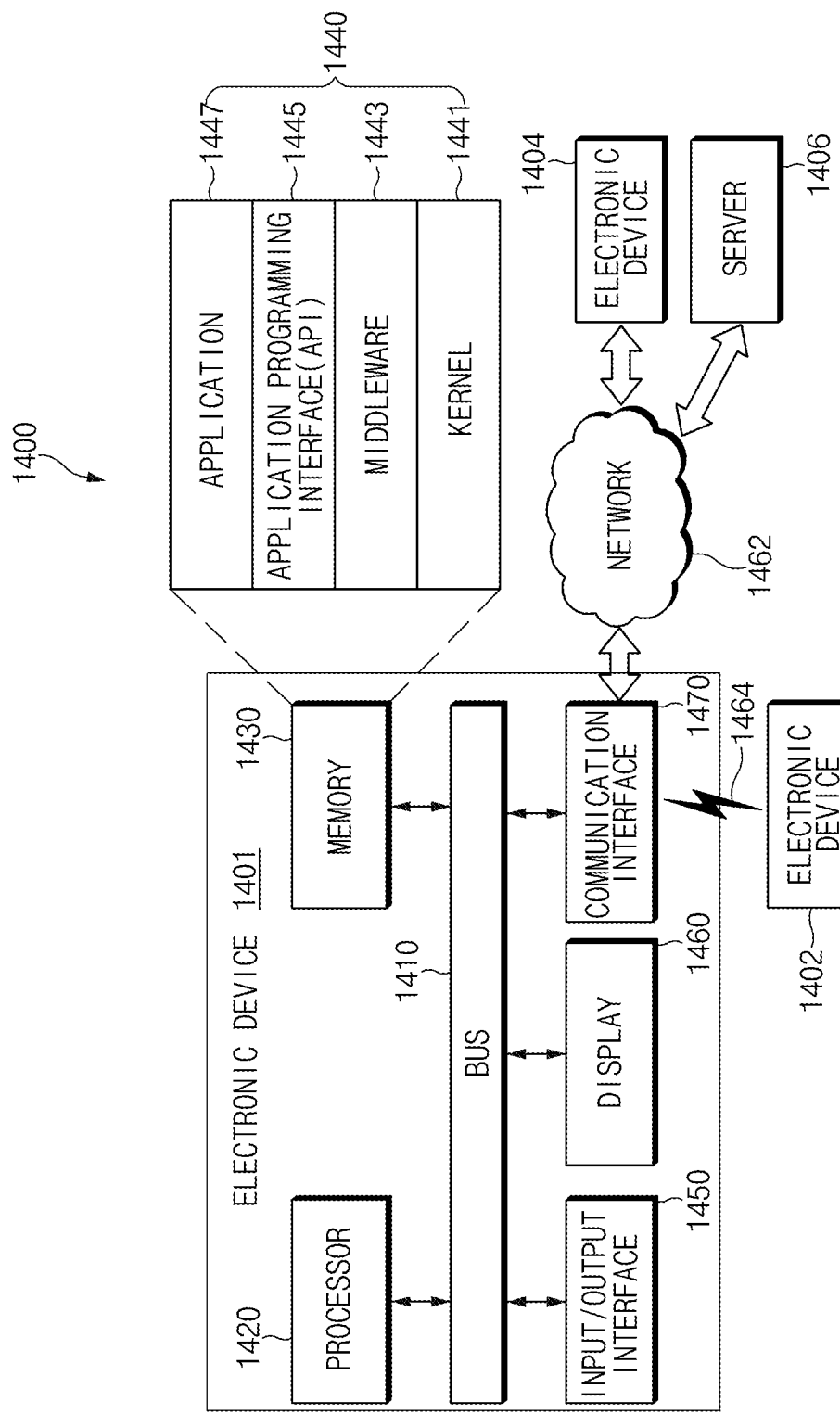
FIG. 14 is a block diagram of an electronic device in a network environment according to an embodiment of the present disclosure.

FIG. 14 is a block diagram of an electronic device in a network environment according to an embodiment of the present disclosure.

Referring to FIG. 14, according to various embodiments, an electronic device 1401, 1402, or 1404 or a server 1406 may be connected with each other through a network 1462 or a local area network 1464. The electronic device 1401 may include a bus 1410, a processor 1420, a memory 1430, an input/output interface 1450, a display 1460, and a communication module 1470. According to an embodiment, the electronic device 1401 may not include at least one of the above-described elements or may further include other element(s).

For example, the bus 1410 may interconnect the above-described elements 1410 to 170 and may include a circuit for conveying communications (e.g., a control message and/or data) among the above-described elements.

The processor 1420 may include one or more of a CPU, an AP, or a communication processor (CP). For example, the processor 1420 may perform an arithmetic operation or data processing associated with control and/or communication of at least other elements of the electronic device 1401.

The memory 1430 may include a volatile and/or nonvolatile memory. The memory 1430 may store instructions or data associated with at least one other element(s) of the electronic device 1401. According to an embodiment, the memory 1430 may store software and/or a program 1440. The program 1440 may include, for example, a kernel 1441, a middleware 1443, an application programming interface (API) 1445, and/or an application program (or an application) 1447. At least a part of the kernel 1441, the middleware 1443, or the API 1445 may be called an "operating system (OS)."

The I/O interface 1450 may transmit an instruction or data, input from a user or another external device, to other element(s) of the electronic device 1401. Furthermore, the input/output interface 1450 may output an instruction or data, received from other element(s) of the electronic device 1401, to a user or another external device.

The display 1460 may include, for example, a liquid crystal display (LCD), a light-emitting diode (LED) display, an organic LED (OLED) display, or a microelectromechanical systems (MEMS) display, or an electronic paper display. The display 1460 may display, for example, various contents (e.g., a text, an image, a video, an icon, a symbol, and the like) to a user. The display 1460 may include a touch screen and may receive, for example, a touch, gesture, proximity, or hovering input using an electronic pen or a part of a user's body.

The communication module 1470 may establish communication between the electronic device 1401 and an external device (e.g., a first external electronic device 1402, a second external electronic device 1404, or a server 1406). For example, the communication module 1470 may be connected to a network 1462 through wireless communication or wired communication to communicate with the external device (e.g., the second external electronic device 1404 or the server 1406).

The wireless communication may include at least one of, for example, long-term evolution (LTE), LTE advance (LTE-A), code division multiple access (CDMA), wideband CDMA (WCDMA), universal mobile telecommunications system (UMTS), wireless broadband (wiBro), or global system for mobile communications (GSM), or the like, as cellular communication protocol. Furthermore, the wireless communication may include, for example, the local area network 1464. The local area network 1464 may include at least one of a Wi-Fi, a Bluetooth, a near field communication (NFC), a magnetic stripe transmission (MST), or a global navigation satellite system (GNSS), or the like.

The MST may generate a pulse in response to transmission data using an electromagnetic signal, and the pulse may generate a magnetic field signal. The electronic device 1401 may transfer the magnetic field signal to point of sale (POS), the POS may detect the magnetic field signal using a MST reader. The electronic device 1401 may recover the data by converting the detected magnetic field signal to an electrical signal.

The GNSS may include at least one of a GPS, a global navigation satellite system (Glonass), Beidou Navigation Satellite System (hereinafter referred to as "Beidou"), the European global satellite-based navigation system (Galileo), or the like. In this specification, "GPS" and "GNSS" may be interchangeably used. The wired communication may include at least one of, for example, a universal serial bus (USB), a high definition multimedia interface (HDMI), a recommended standard-232 (RS-232), or a plain old telephone service (POTS). The network 1462 may include at least one of telecommunications networks, for example, a computer network (e.g., LAN or wide area network (WAN)), an Internet, or a telephone network.

Each of the first and second external electronic devices 1402 and 1404 may be a device of which the type is different from or the same as that of the electronic device 1401. According to an embodiment, the server 1406 may include a group of one or more servers. According to various embodiments, all or a part of operations that the electronic device 1401 will perform may be executed by another or plural electronic devices (e.g., the electronic devices 1402 and 1404 or the server 1406). According to an embodiment, in the case where the electronic device 1401 executes any function or service automatically or in response to a request, the electronic device 1401 may not perform the function or the service internally, but, alternatively additionally, it may request at least a part of a function associated with the electronic device 201 at other device (e.g., the electronic device 1402 or 1404 or the server 1406). The other electronic device (e.g., the electronic device 1402 or 1404 or the server 1406) may execute the requested function or additional function and may transmit the execution result to the electronic device 1401. The electronic device 1401 may provide the requested function or service using the received result or may additionally process the received result to provide the requested function or service. To this end, for example, cloud computing, distributed computing, or client-server computing may be used.

Figure 15:
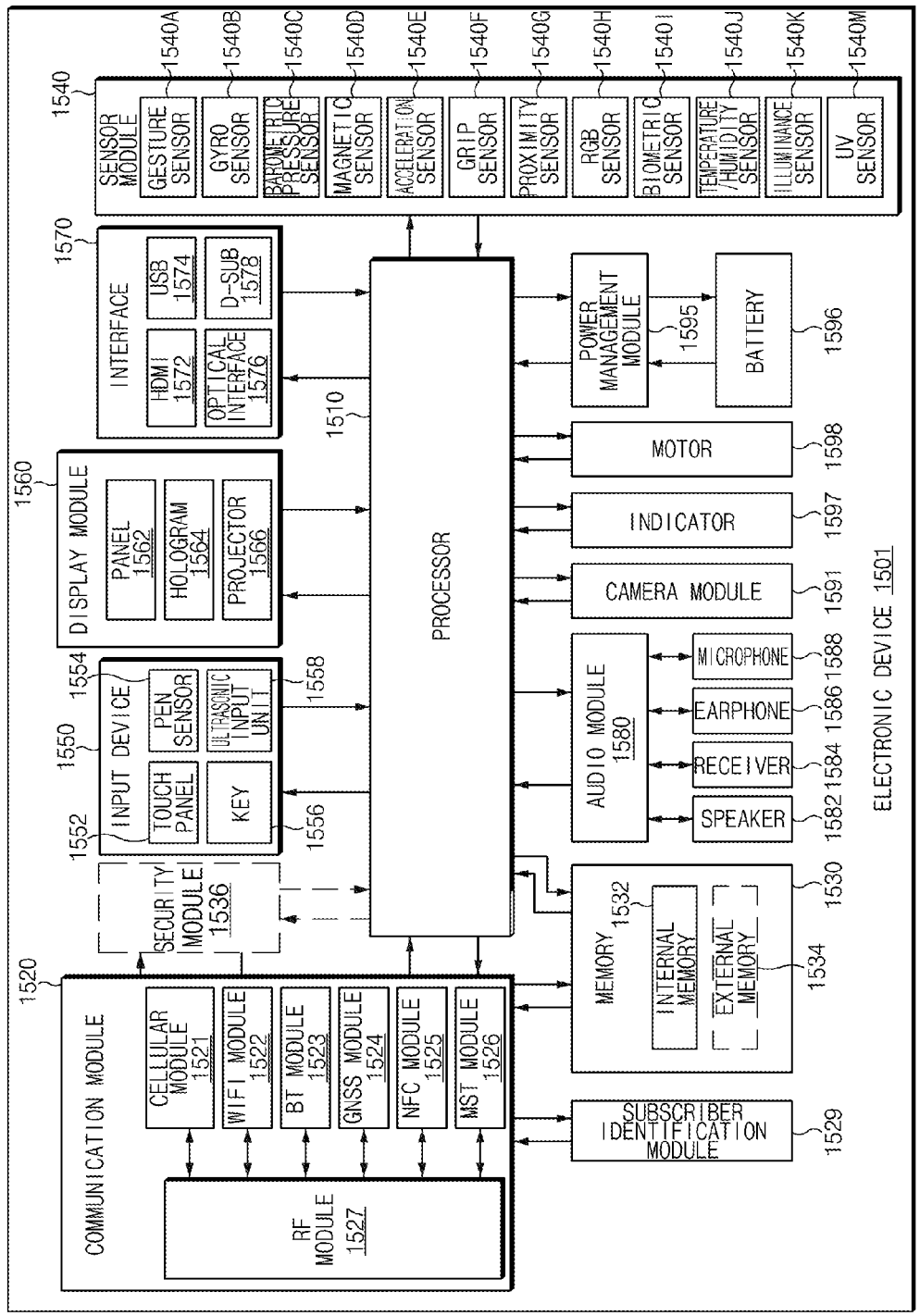
FIG. 15 is a block diagram illustrating an electronic device according to an embodiment of the present disclosure.

FIG. 15 is a block diagram illustrating an electronic device according to an embodiment of the present disclosure.

Referring to FIG. 15, the electronic device 1501 may include, for example, all or a part of the electronic device 1401 illustrated in FIG. 14. The electronic device 1501 may include one or more processors (e.g., an AP) 1510, a communication module 1520, a subscriber identification module 1529, a memory 1530, a sensor module 1540, an input device 1550, a display module 1560, an interface 1570, an audio module 1580, a camera module 1591, a power management module 1595, a battery 1596, an indicator 1597, and a motor 1598.

The processor 1510 may drive an OS or an application to control a plurality of hardware or software elements connected to the processor 1510 and may process and compute a variety of data. The processor 1510 may be, for example, implemented with a system on chip (SoC). According to an embodiment, the processor 1510 may further include a graphic processing unit (GPU) and/or an image signal processor (ISP). The processor 1510 may include at least a part (e.g., a cellular module 1521) of elements illustrated in FIG. 15. The processor 1510 may load and process an instruction or data, which is received from at least one of other elements (e.g., a nonvolatile memory), to volatile memory and may store a variety of data at a nonvolatile memory.

The communication module 1520 may be configured the same as or similar to the communication module 1470 of FIG. 14. The communication module 1520 may include the cellular module 1521, a Wi-Fi module 1522, a Bluetooth (BT) module 1523, a GNSS module 1524 (e.g., a GPS module, a Glonass module, a Beidou module, or a Galileo module), a NFC module 1525, a MST module 1526, and a radio frequency (RF) module 1527.

The cellular module 1521 may provide voice communication, video communication, a character service, an Internet service or the like through a communication network. According to an embodiment, the cellular module 1521 may perform discrimination and authentication of the electronic device 1501 within a communication network using the subscriber identification module 1529 (e.g., a SIM card). According to an embodiment, the cellular module 1521 may perform at least a portion of functions that the processor 1510 provides. According to an embodiment, the cellular module 1521 may include a CP.

Each of the Wi-Fi module 1522, the BT module 1523, the GNSS module 1524, the NFC module 1525, or the MST module 1526 may include a processor for processing data exchanged through a corresponding module, for example. According to an embodiment, at least a part (e.g., two or more components) of the cellular module 1521, the Wi-Fi module 1522, the BT module 1524, the GNSS module 1524, the NFC module 1525, or the MST module 1526 may be included within one integrated circuit (IC) or an IC package.

The RF module 1527 may transmit and receive a communication signal (e.g., an RF signal). The RF module 1527 may include a transceiver, a power amplifier module (PAM), a frequency filter, a low noise amplifier (LNA), an antenna, or the like. According to another embodiment, at least one of the cellular module 1521, the Wi-Fi module 1522, the BT module 1523, the GNSS module 1524, the NFC module 1525, or the MST module 1526 may transmit and receive an RF signal through a separate RF module 1527.

The subscriber identification module 1529 may include, for example, a card and/or an embedded SIM that includes a subscriber identification module and may include unique identify information (e.g., integrated circuit card identifier (ICCID)) or subscriber information (e.g., integrated mobile subscriber identity (IMSI)).

The memory 1530 (e.g., the memory 1430) may include an internal memory 1532 or an external memory 1534. For example, the internal memory 1532 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1534 may include a flash drive, for example, compact flash (CF), secure digital (SD), micro SD (Micro-SD), mini SD (Mini-SD), extreme digital (xD), multimedia card (MMC), memory stick or the like. The external memory 1534 may be functionally and/or physically connected to the electronic device 1501 through various interfaces.

A security module 1536 may be a circuit that guarantees a safe may be a module that includes a storage space of which a security level is higher than that of the memory 1530. The security module 1536 may be implemented as a separate circuit and may include a separate processor. Furthermore, the security module 1536 may be driven on other OS that is different from OS of the electronic device 1501. For example, the security module 1536 may be driven based on java card open platform (JCOP) OS.

The sensor module 1540 may measure, for example, a physical quantity or may detect an operation state of the electronic device 1501. The sensor module 940 may convert the measured or detected information to an electric signal. Generally or additionally, the sensor module 1540 may include at least one of a gesture sensor 1540A, a gyro sensor 1540B, a barometric pressure sensor 1540C, a magnetic sensor 1540D, an acceleration sensor 1540E, a grip sensor 1540F, a proximity sensor 1540G, a color sensor 1540H (e.g., red, green, blue (RGB) sensor), a biometric sensor 1540I, a temperature/humidity sensor 1540J, an illuminance sensor 1540K, or an ultraviolet (UV) sensor 1540M. Although not illustrated, additionally or generally, the sensor module 1540 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, a fingerprint sensor, and the like. The sensor module 1540 may further include a control circuit for controlling at least one or more sensors included therein. According to an embodiment, the electronic device 1501 may further include a processor which is a part of the processor 1510 or independent of the processor 1510 and is configured to control the sensor module 1540. The processor may control the sensor module 1540 while the processor 1510 remains at a sleep state.

The input device 1550 may include, for example, a touch panel 1552, a (digital) pen sensor 1554, a key 1556, or an ultrasonic input unit 1558. The touch panel 1552 may use at least one of capacitive, resistive, infrared or ultrasonic method. Also, the touch panel 1552 may further include a control circuit. The touch panel 1552 may further include a tactile layer to provide a tactile reaction to a user.

The (digital) pen sensor 1554 may be, for example, a part of a touch panel or may include an additional sheet for recognition. The key 1556 may include, for example, a physical button, an optical key, a keypad, or the like. The ultrasonic input device 1558 may detect (or sense) an ultrasonic signal, which is generated from an input device, through a microphone (e.g., a microphone 1588) and may check data corresponding to the detected ultrasonic signal.

The display 1560 (e.g., the display 1460) may include a panel 1562, a hologram device 1564, or a projector 1566. The panel 1562 may be configured to be the same as or similar to the display 1460 illustrated in FIG. 14. The panel 1562 may be implemented, for example, to be flexible, transparent or wearable. The panel 1562 and the touch panel 1552 may be integrated into a single module. The hologram device 1564 may display a stereoscopic image in a space using a light interference phenomenon. The projector 1566 may project light onto a screen so as to display an image. The screen may be arranged, for example, in the inside or the outside of the electronic device 1501. According to an embodiment, the display 1560 may further include a control circuit for controlling the panel 1562, the hologram device 1564, or the projector 1566.

The interface 1570 may include, for example, a HDMI 1572, a USB 1574, an optical interface 1576, or a D-subminiature (D-sub) 1578. The interface 1570 may be included, for example, in a communication module 1470 illustrated in FIG. 14. Additionally or generally, the interface 1570 may include, for example, a mobile high definition link (MHL) interface, a SD card/MMC interface, or an infrared data association (IrDA) standard interface.

The audio module 1580 may convert a sound and an electric signal in dual directions. At least a part of the audio module 1580 may be included, for example, in the input/output interface 1450 illustrated in FIG. 14. The audio module 1580 may process, for example, sound information that is inputted or outputted through a speaker 1582, a receiver 1584, an earphone 1586, or the microphone 1588.

The camera module 1591 for shooting a still image or a video may include, for example, at least one image sensor (e.g., a front sensor or a rear sensor), a lens, an ISP, or a flash (e.g., an LED or a xenon lamp).

The power management module 1595 may manage, for example, power of the electronic device 1501. According to an embodiment, a power management integrated circuit (PMIC), a charger IC, or a battery or fuel gauge may be included in the power management module 1595. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1596 and a voltage, current or temperature thereof while the battery is charged. The battery 1596 may include, for example, a rechargeable battery and/or a solar battery.

The indicator 1597 may display a specific state of the electronic device 1501 or a portion thereof (e.g., the processor 1510), such as a booting state, a message state, a charging state, or the like. The motor 1598 may convert an electrical signal into a mechanical vibration and may generate the following effect: vibration, haptic, or the like. Although not illustrated, a processing device (e.g., a GPU) for supporting a mobile TV may be included in the electronic device 1501. The processing device for supporting a mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. The electronic device according to various embodiments may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 16:
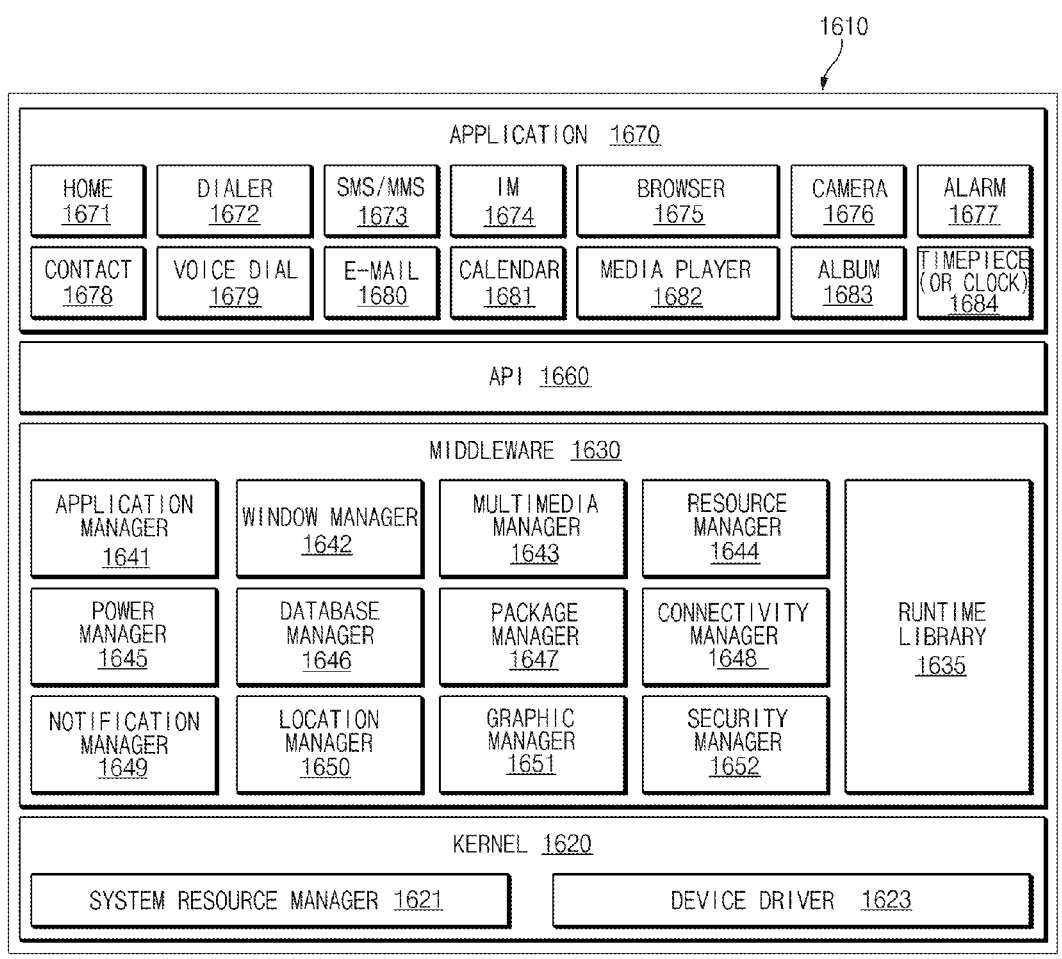
FIG. 16 is a block diagram illustrating a program module, according to an embodiment of the present disclosure.

FIG. 16 is a block diagram illustrating a program module, according to an embodiment of the present disclosure.

Referring to FIG. 16, a program module 1610 (e.g., the program 1440) may include an OS to control resources associated with an electronic device (e.g., the electronic device 1401), and/or diverse applications (e.g., the application program 1447) driven on the OS. The OS may be, for example, android, iOS, windows, Symbian, Tizen, or Bada.

The program module 1610 may include a kernel 1620, a middleware 1630, an API 1660, and/or an application 1670. At least a part of the program module 1610 may be preloaded on an electronic device or may be downloadable from an external electronic device (e.g., an electronic device 1402 or 1404, a server 1406, and the like).

The kernel 1620 (e.g., the kernel 1441) may include, for example, a system resource manager 1621 and/or a device driver 1623. The system resource manager 1621 may perform control, allocation, or retrieval of system resources. According to an embodiment, the system resource manager 1621 may include a process managing part, a memory managing part, or a file system managing part. The device driver 1623 may include, for example, a display driver, a camera driver, a Bluetooth driver, a common memory driver, an USB driver, a keypad driver, a Wi-Fi driver, an audio driver, or an inter-process communication (IPC) driver.

The middleware 1630 may provide, for example, a function that the application 1670 needs in common or may provide diverse functions to the application 1670 through the API 1660 to allow the application 1670 to efficiently use limited system resources of the electronic device. According to an embodiment, the middleware 1630 (e.g., a middleware 1443) may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, or a security manager 1654.

The runtime library 1635 may include, for example, a library module which is used by a compiler to add a new function through a programming language while the application 1670 is being executed. The runtime library 1635 may perform input/output management, memory management, or capacities about arithmetic functions.

The application manager 1641 may manage, for example, a life cycle of at least one application of the application 1670. The window manager 1642 may manage a GUI resource that is used in a screen. The multimedia manager 1643 may identify a format necessary for playing diverse media files and may perform encoding or decoding of media files by using a codec suitable for the format. The resource manager 1644 may manage resource, such as a storage space, a memory, and a source code of at least one application of the application 1670.

The power manager 1645 may operate, for example, with a basic input/output system (BIOS) to manage a battery or power and may provide power information for an operation of an electronic device. The database manager 1646 may generate, search for, or modify database that is to be used in at least one application of the application 1670. The package manager 1647 may install or update an application that is distributed in the form of package file.

The connectivity manager 1648 may manage, for example, wireless connection such as Wi-Fi or Bluetooth. The notification manager 1649 may display or notify an event such as arrival message, promise, or proximity notification in a mode that does not disturb a user. The location manager 1650 may manage location information of an electronic device. The graphic manager 1651 may manage a graphic effect that is provided to a user or manage a user interface relevant thereto. The security manager 1652 may provide a general security function necessary for system security or user authentication. According to an embodiment, in the case where an electronic device (e.g., the electronic device 1401) includes a telephony function, the middleware 1630 may further includes a telephony manager for managing a voice or video call function of the electronic device.

The middleware 1630 may include a middleware module that combines diverse functions of the above-described elements. The middleware 1630 may provide a module specialized to each OS kind to provide differentiated functions. Additionally, the middleware 1630 may remove a part of the preexisting elements, dynamically, or may add new elements thereto.

The API 1660 (e.g., the API 1445) may be, for example, a set of programming functions and may be provided with a configuration which is variable depending on an OS. For example, in the case where an OS is the android or the iOS, it may be permissible to provide one API set per platform. In the case where an OS is the Tizen, it may be permissible to provide two or more API sets per platform.

The application 1670 (e.g., the application program 1447) may include, for example, one or more applications capable of providing functions for a home 1671, a dialer 1672, an SMS/MMS 1673, an instant message (IM) 1674, a browser 1675, a camera 1676, an alarm 1677, a contact 1678, a voice dial 1679, an e-mail 1680, a calendar 1681, a media player 1682, an album 1683, and a clock 1684, health care (e.g., measuring an exercise quantity or blood sugar), or environment information (e.g., barometric pressure, humidity, or temperature).

According to an embodiment of the present disclosure, the application 1670 may include an application (hereinafter referred to as "information exchanging application" for descriptive convenience) to support information exchange between the electronic device (e.g., the electronic device 1401) and an external electronic device (e.g., the electronic device 1402 or 1404). The information exchanging application may include, for example, a notification relay application for transmitting specific information to the external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., an electronic device 1402 or 1404). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 1402 or 1404) which communicates with the electronic device, an application running in the external electronic device, or a service (e.g., a call service, a message service, or the like) provided from the external electronic device.

According to an embodiment, the application 1670 may include an application (e.g., a health care application of a mobile medical device) which is assigned in accordance with an attribute of the external electronic device (e.g., an electronic device 1402 or 1404). According to an embodiment, the application 1670 may include an application which is received from an external electronic device (e.g., the server 1406 or the electronic device 1402 or 1404). According to an embodiment, the application 1670 may include a preloaded application or a third party application which is downloadable from a server. The elements titles of the program module 1610 according to the embodiment may be modifiable depending on kinds of OSs.

According to various embodiments, at least a portion of the program module 1610 may be implemented by software, firmware, hardware, or a combination of two or more thereof. At least a portion of the program module 1610 may be implemented (e.g., executed), for example, by the processor (e.g., the processor 1510). At least a portion of the program module 1610 may include, for example, modules, programs, routines, sets of instructions, processes, or the like, for performing one or more functions.

The term "module" used in this disclosure may represent, for example, a unit including one or more combinations of hardware, software and firmware. For example, the term "module" may be interchangeably used with the terms "unit," "logic," "logical block," "component" and "circuit." The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1510), may cause the one or more processors to perform a function corresponding to the instruction. The computer-readable storage media, for example, may be the memory 130.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware devices may be configured to operate as one or more software modules to perform operations according to various embodiments, and vice versa.

Modules or program modules according to various embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. Also, a portion of operations may be executed in different sequences, omitted, or other operations may be added.

According to various embodiments of the present disclosure, the data transmitting method may include setting an optimal encoding parameter based on a channel environment changed in real time, and thus the sound quality occurring during encoding may be minimized. Accordingly, a packet error, a packet loss, and a packet delay may decrease. Besides, a variety of effects directly or indirectly understood through the present disclosure may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a memory;
   a communication circuit configured to communicate with an external device based on a protocol; and
   a processor configured to:
      generate second data by encoding first data based on an encoding parameter,
      store the second data in the memory,
      transmit the second data to the external device through the communication circuit, and
      change the encoding parameter based on a remaining storage space of the memory,
   wherein the encoding parameter comprises a parameter associated with an encoding compression rate, and
   wherein, if a capacity of a remaining storage space of the memory is greater than a designated value, the processor is further configured to change the parameter associated with the encoding compression rate such that the encoding compression rate decreases.

2. The electronic device of claim 1, wherein the parameter associated with the encoding compression rate comprises a bitpool value.

3. The electronic device of claim 1, wherein, if a capacity of a remaining storage space of the memory is less than or equal to a designated value, the processor is further configured to change the parameter associated with the encoding compression rate such that the encoding compression rate increases.

4. The electronic device of claim 1, wherein the first data comprises pulse code modulation (PCM) data.

5. The electronic device of claim 1, wherein the processor is further configured to encode the first data by using a codec.

6. The electronic device of claim 5, wherein the codec is a codec that is supported by the external device.

7. The electronic device of claim 1, wherein the communication circuit includes at least one of a Bluetooth module, a Bluetooth low energy (BLE) module, a wireless personal area network (WPAN) module, a wireless local area network (WLAN) module, a wireless-fidelity (Wi-Fi) module, a zig-bee module, a Z-wave module, an ANT module, or an ANT+ module.

8. The electronic device of claim 1, wherein the memory comprises a buffer.

9. The electronic device of claim 1, wherein the processor is further configured to:
   packetize the encoded second data, and
   store the packetized second data in the memory, and
   wherein a header of the packetized second data comprises a header according to a logical link control and adaptation protocol (L2CAP) or an audio/video distribution transport protocol (AVDTP).

10. The electronic device of claim 1, wherein, if receiving an ACK signal from the external device, the processor is further configured to:
    read the second data from the memory, and
    transmit the read second data to the external device.

11. A data transmitting method of an electronic device, the method comprising:
    changing a parameter associated with an encoding compression rate based on a remaining storage space of a memory included in the electronic device;
    generating second data by encoding first data based on the parameter;
    storing the second data in the memory;
    reading the second data from the memory; and
    transmitting the second data to an external device,
    wherein the changing of the parameter comprises changing the parameter such that the encoding compression rate decreases if a capacity of a remaining storage space of the memory is greater than a designated value.

12. The method of claim 11, wherein the parameter comprises a bitpool value.

13. The method of claim 11, wherein the changing of the parameter comprises changing the parameter such that the encoding compression rate increases if a capacity of the remaining storage space of the memory is less than or equal to a value.

14. The method of claim 11, wherein the memory comprises a buffer.

15. The method of claim 11, wherein a header of the packetized second data comprises a header according to a logical link control and adaptation protocol (L2CAP) or an audio/video distribution transport protocol (AVDTP).

16. The method of claim 11, wherein the reading of the second data comprises reading the second data from the memory if an ACK signal is received from the external device.

* * * * *